US011516324B2

(12) United States Patent
Park et al.

(10) Patent No.: US 11,516,324 B2
(45) Date of Patent: Nov. 29, 2022

(54) HINGE STRUCTURE FOR TERMINAL FOLDED IN TWO OPPOSING DIRECTIONS

(71) Applicant: AUFLEX CO., LTD., Hwaseong-si (KR)

(72) Inventors: Hyun Min Park, Suwon-si (KR); Seoung Jun Lee, Uiwang-si (KR)

(73) Assignee: AUFLEX CO., LTD., Hwaseong-si (KR)

( * ) Notice: Subject to any disclaimer, the term of this patent is extended or adjusted under 35 U.S.C. 154(b) by 0 days.

(21) Appl. No.: 17/257,648

(22) PCT Filed: Jul. 5, 2019

(86) PCT No.: PCT/KR2019/008331
§ 371 (c)(1),
(2) Date: Jan. 4, 2021

(87) PCT Pub. No.: WO2020/009549
PCT Pub. Date: Jan. 9, 2020

(65) Prior Publication Data
US 2021/0274028 A1  Sep. 2, 2021

(30) Foreign Application Priority Data
Jul. 5, 2018  (KR) .................. 10-2018-0078455

(51) Int. Cl.
*H04M 1/02* (2006.01)
*G06F 1/16* (2006.01)

(52) U.S. Cl.
CPC ........ *H04M 1/0222* (2013.01); *G06F 1/1618* (2013.01); *G06F 1/1652* (2013.01); *G06F 1/1681* (2013.01); *H04M 1/0268* (2013.01)

(58) Field of Classification Search
CPC . H04M 1/0222; H04M 1/0268; G06F 1/1618; G06F 1/1652; G06F 1/1681
See application file for complete search history.

(56) References Cited

U.S. PATENT DOCUMENTS

| 2011/0063809 A1 | 3/2011 | Hoshino |
| 2013/0010405 A1* | 1/2013 | Rothkopf ............. H05K 5/0226 361/679.01 |
| 2021/0200277 A1* | 7/2021 | Park ...................... E05D 3/122 |

FOREIGN PATENT DOCUMENTS

| KR | 10-2014-0101295 | 8/2014 |
| KR | 10-2016-0090471 | 8/2016 |
| KR | 10-2018-0040117 | 4/2018 |

(Continued)

OTHER PUBLICATIONS

KIPO, PCT Written Opinion of PCT/KR2019/008331 dated Oct. 29, 2019.

*Primary Examiner* — Yuwen Pan
*Assistant Examiner* — Angelica M Perez
(74) *Attorney, Agent, or Firm* — Lex IP Meister, PLLC

(57) ABSTRACT

A hinge structure for a mobile communication terminal that is foldable in two opposite directions is provided. The hinge structure for a mobile communication terminal having a flexible display panel installed therein is foldable inward and outward in a fully unfolded state such that the flexible display panel is disposed inside and outside and a screen on which an image such as a moving image is displayed is invisibly disposed inside or visibly disposed outside in a state in which the mobile communication terminal is folded.

3 Claims, 25 Drawing Sheets

(56) References Cited

FOREIGN PATENT DOCUMENTS

KR  10-2018-0071900      6/2018
TW        M554688    *  1/2018

* cited by examiner

[FIG. 1]
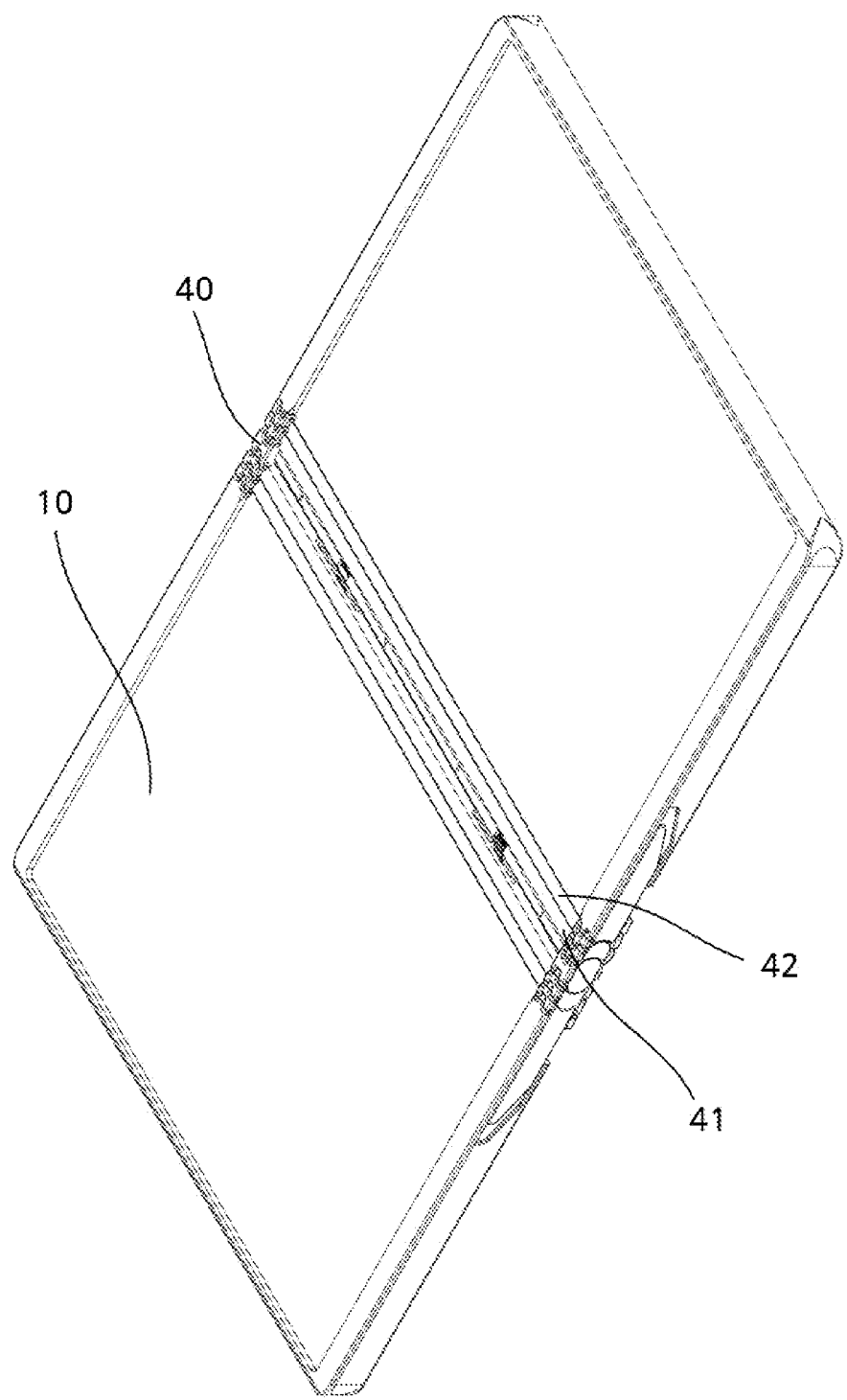

[FIG. 2]
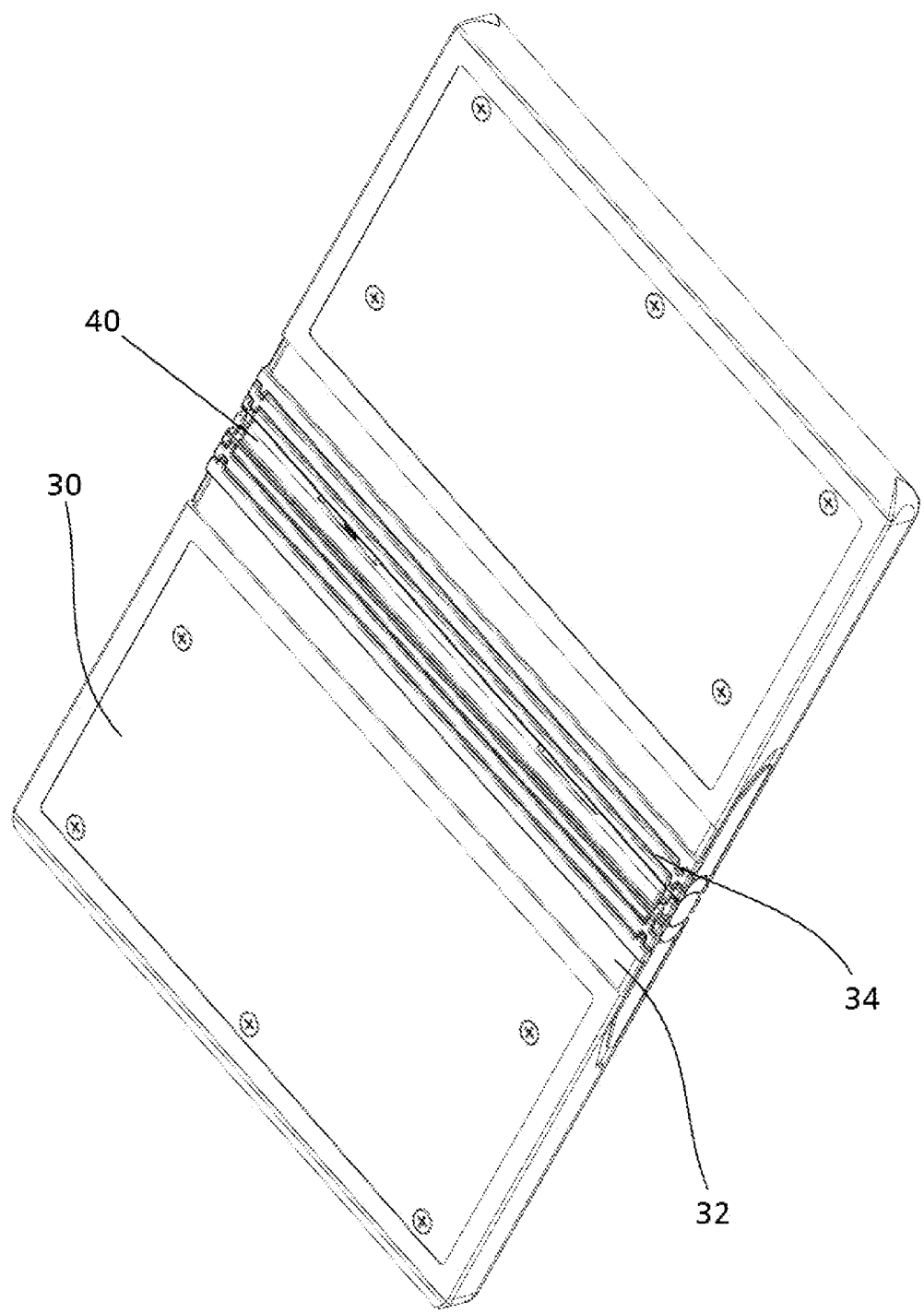

[FIG. 3]
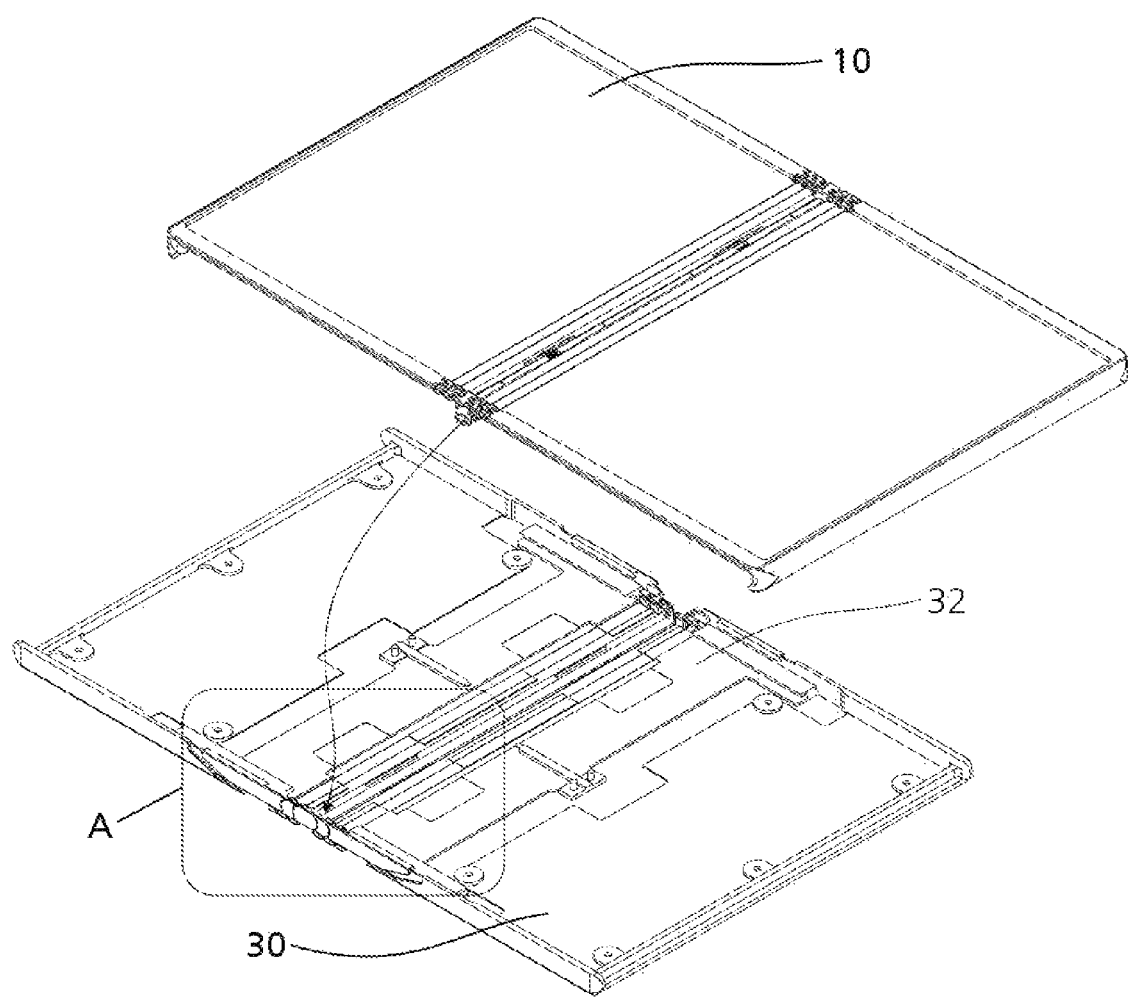

[FIG. 4]
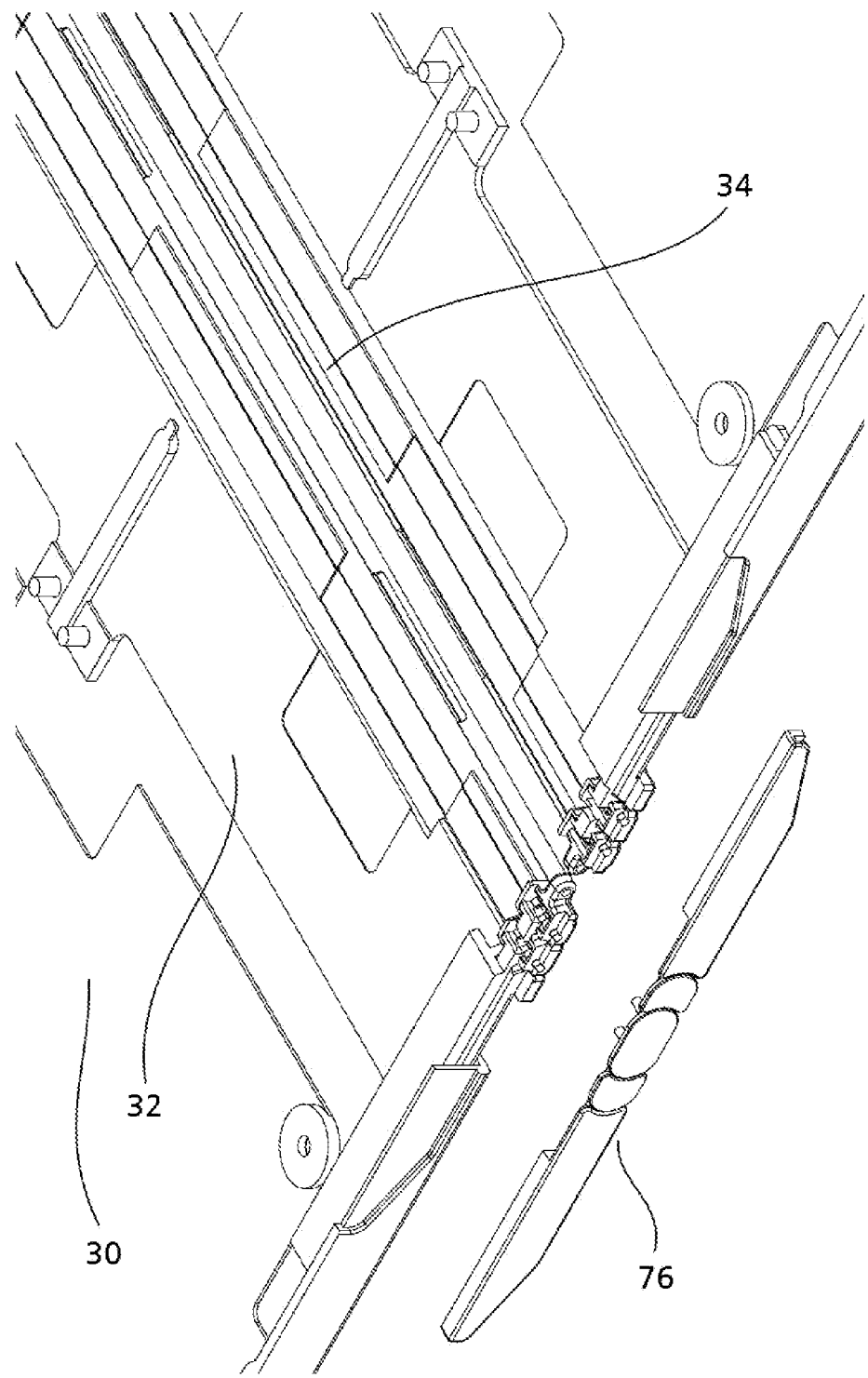

[FIG. 5]
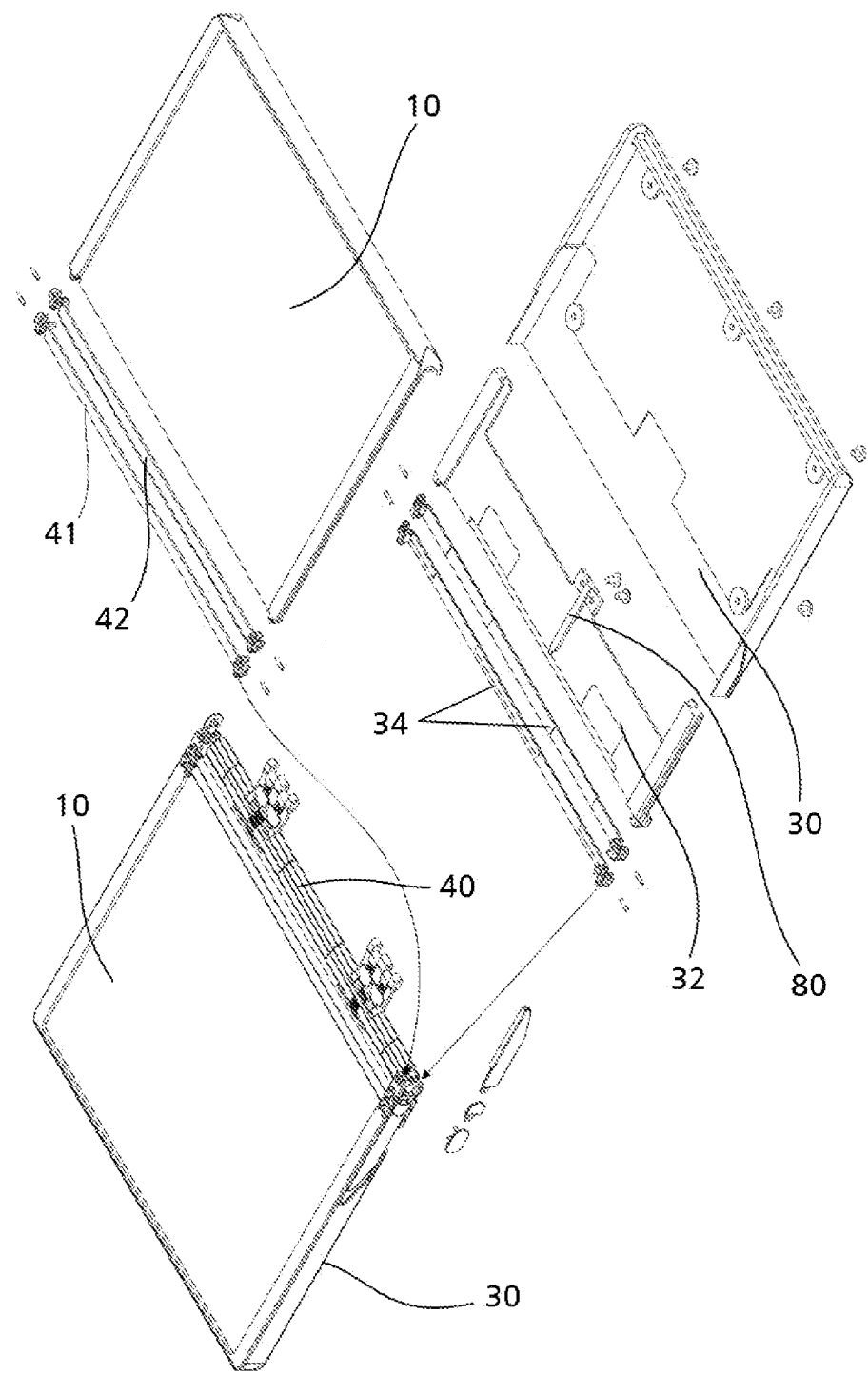

[FIG. 6]
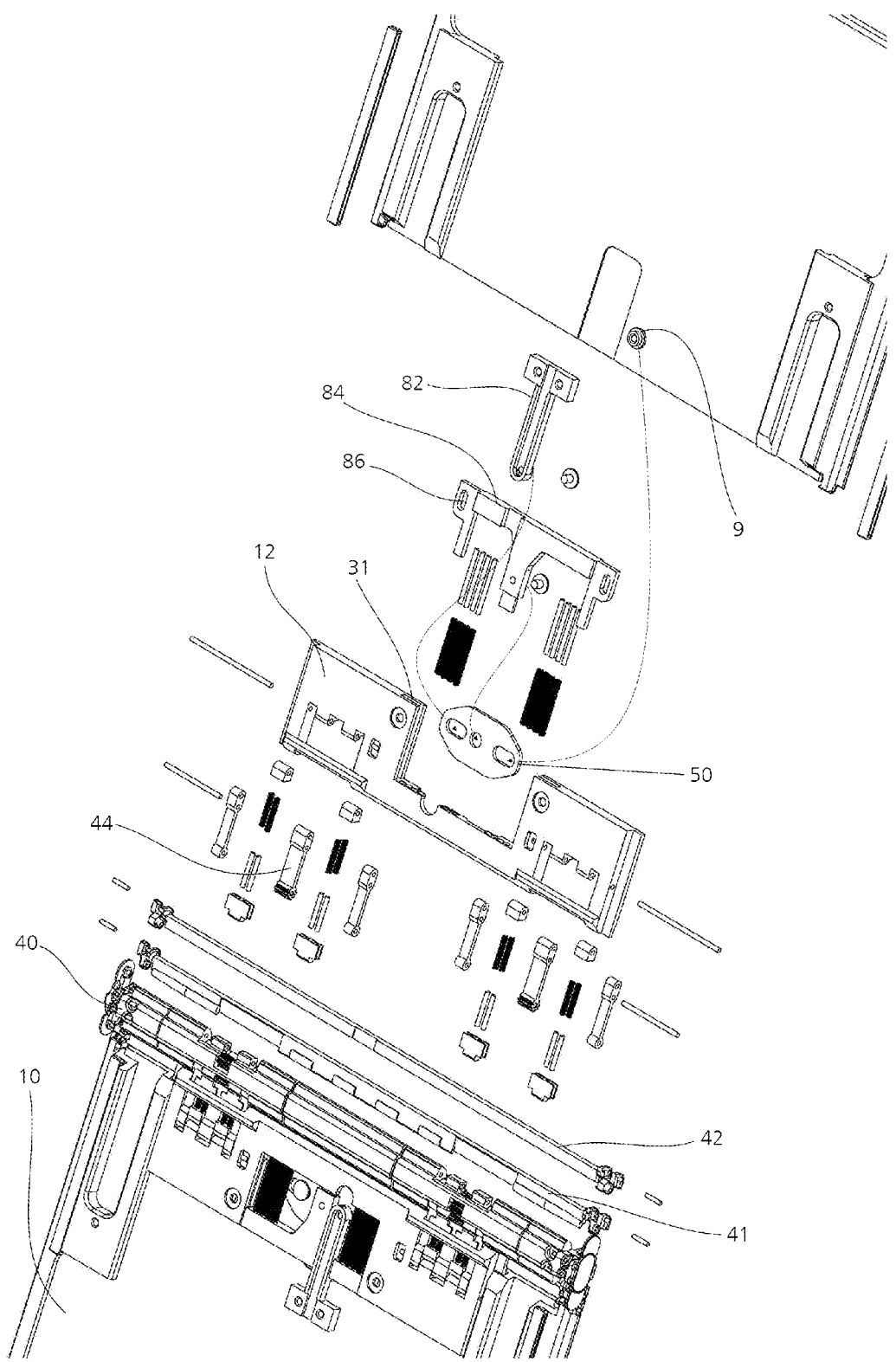

[FIG. 7]
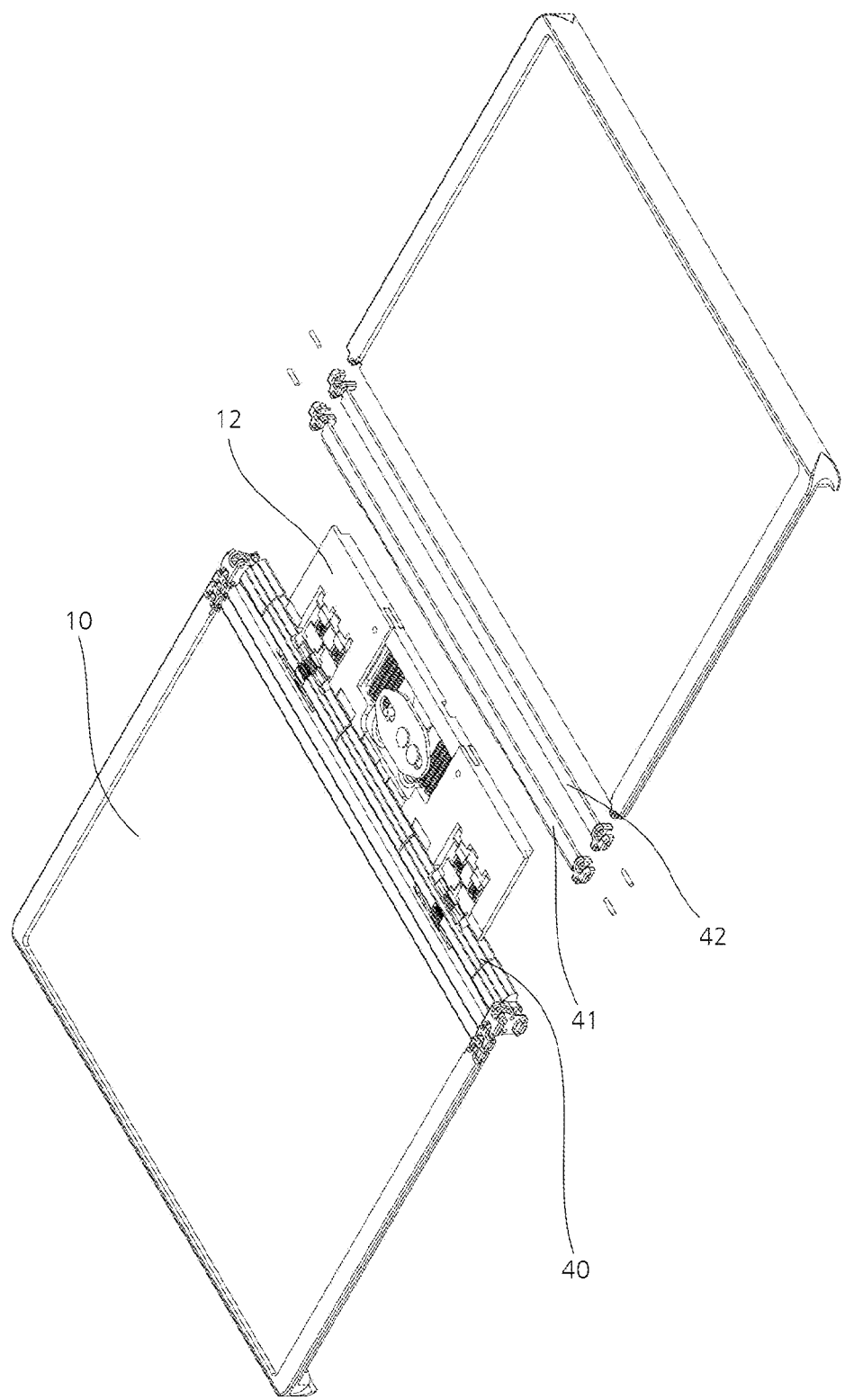

[FIG. 8]
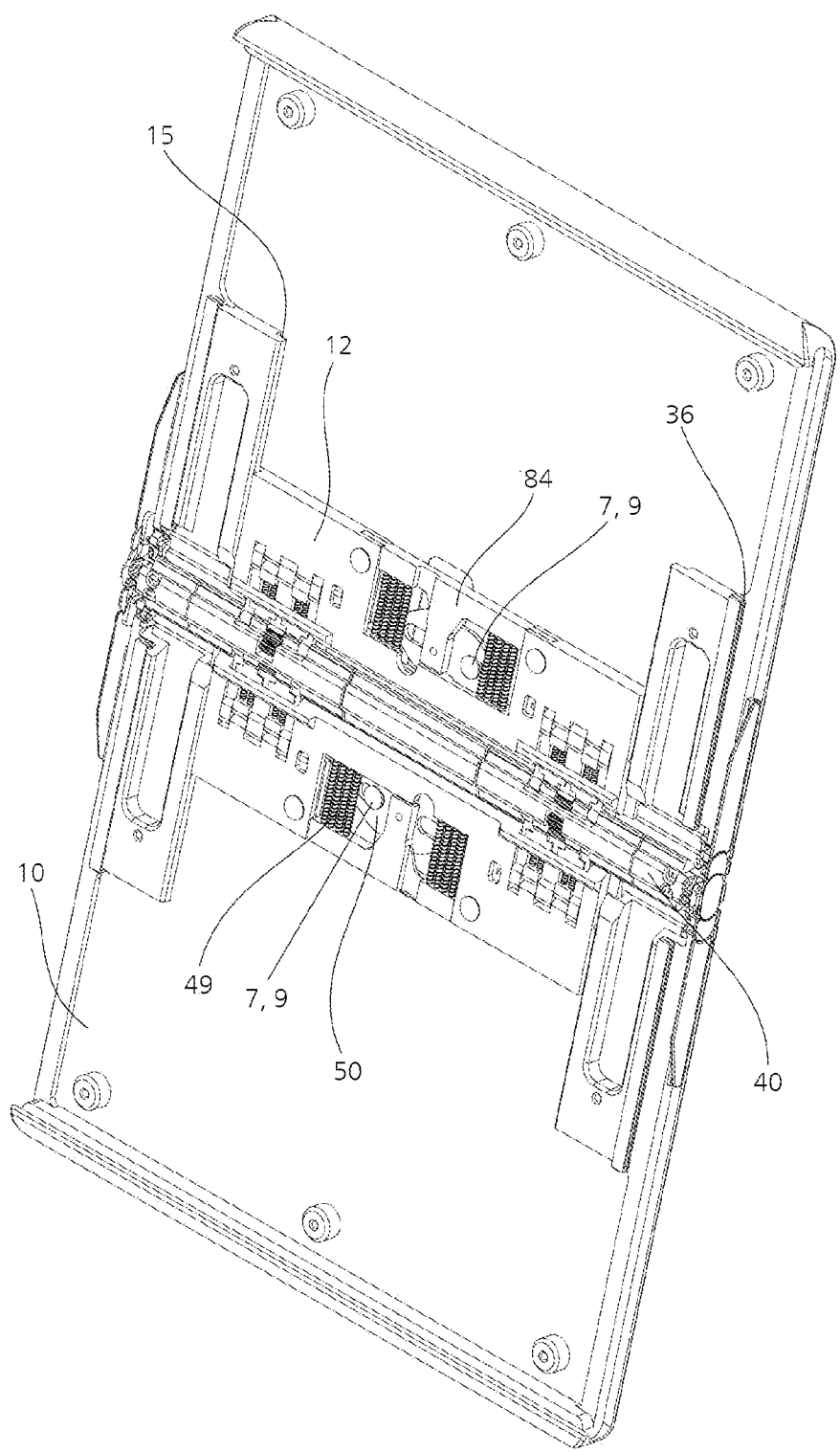

[FIG. 9]
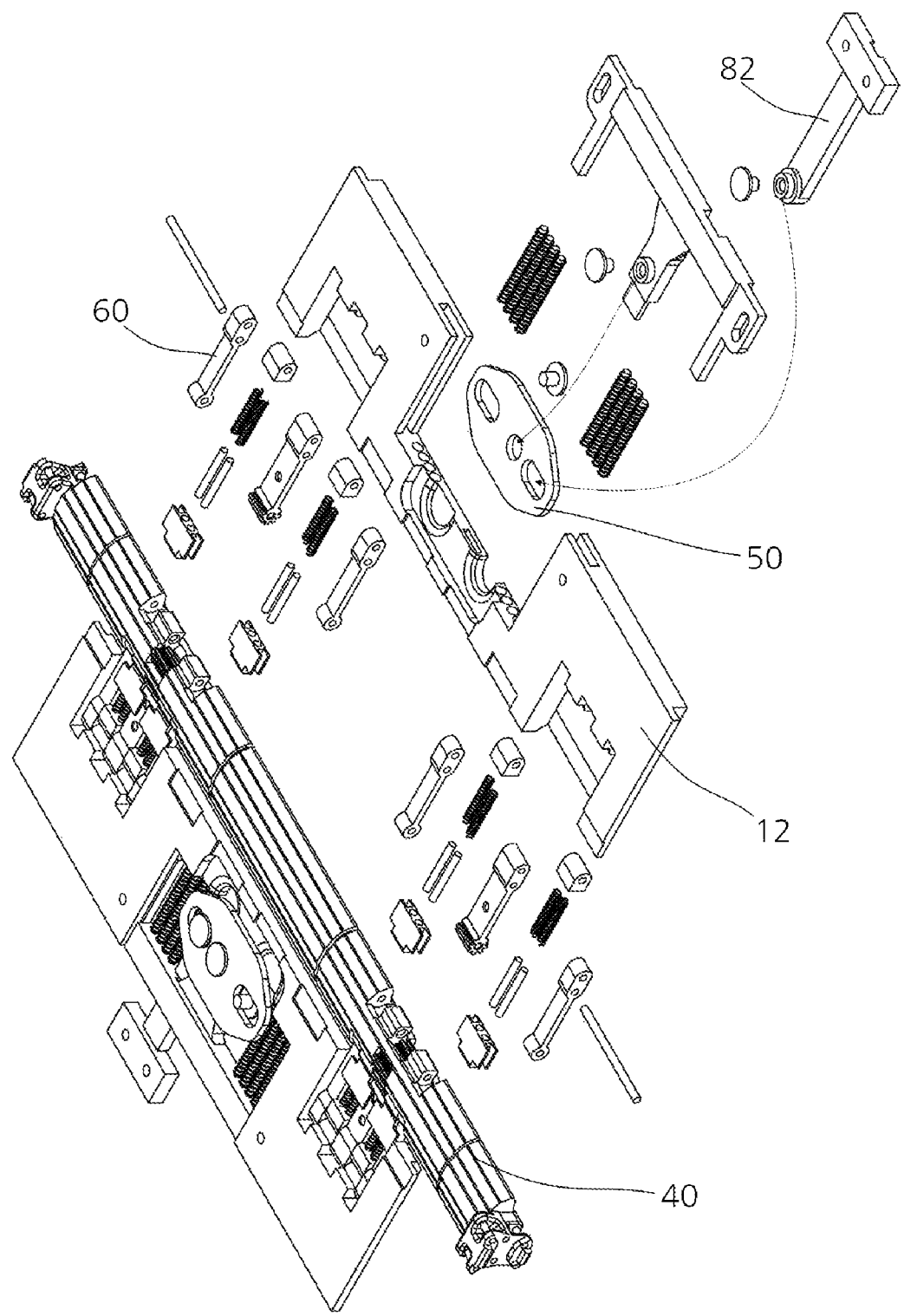

[FIG. 10]
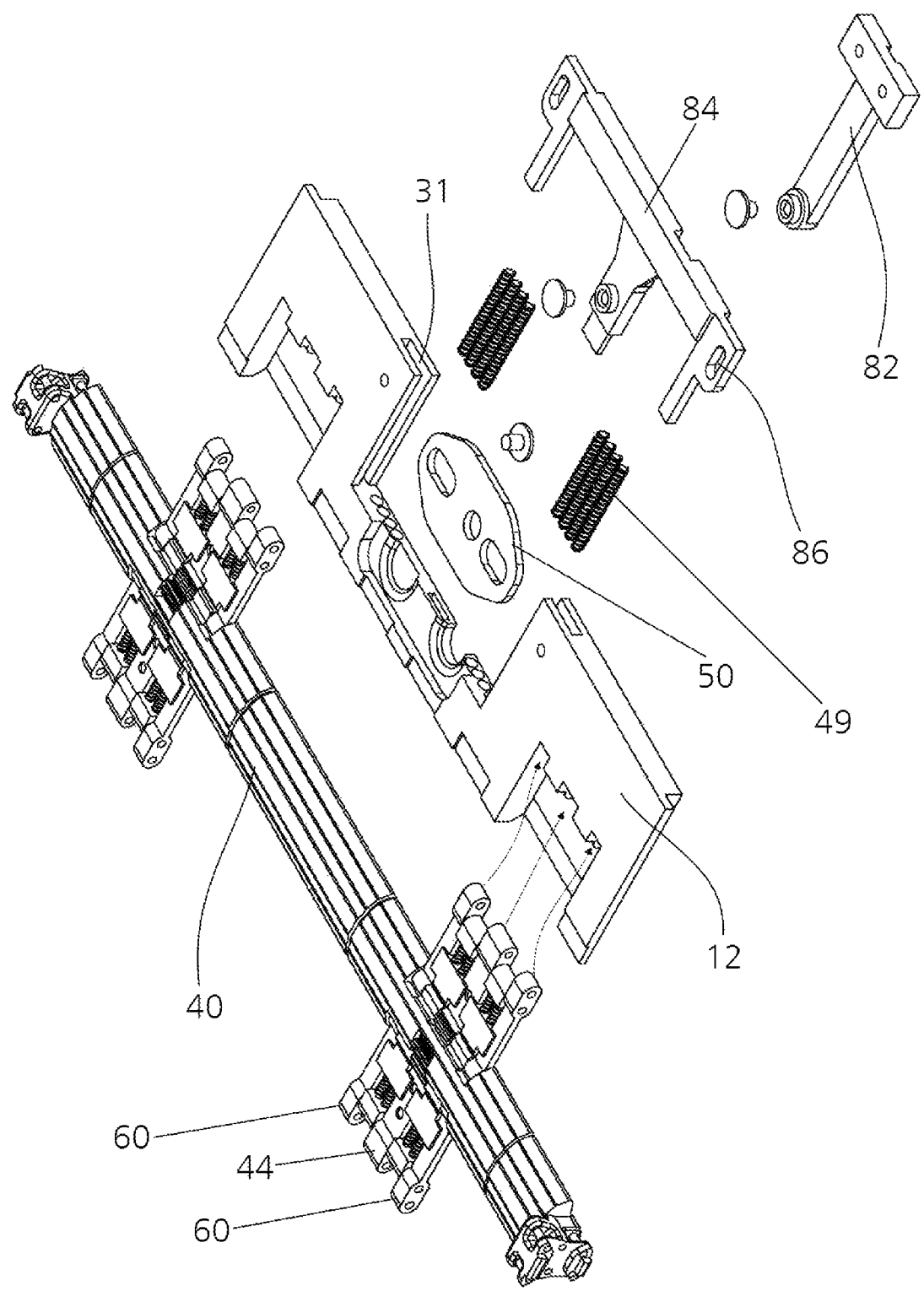

[FIG. 11]
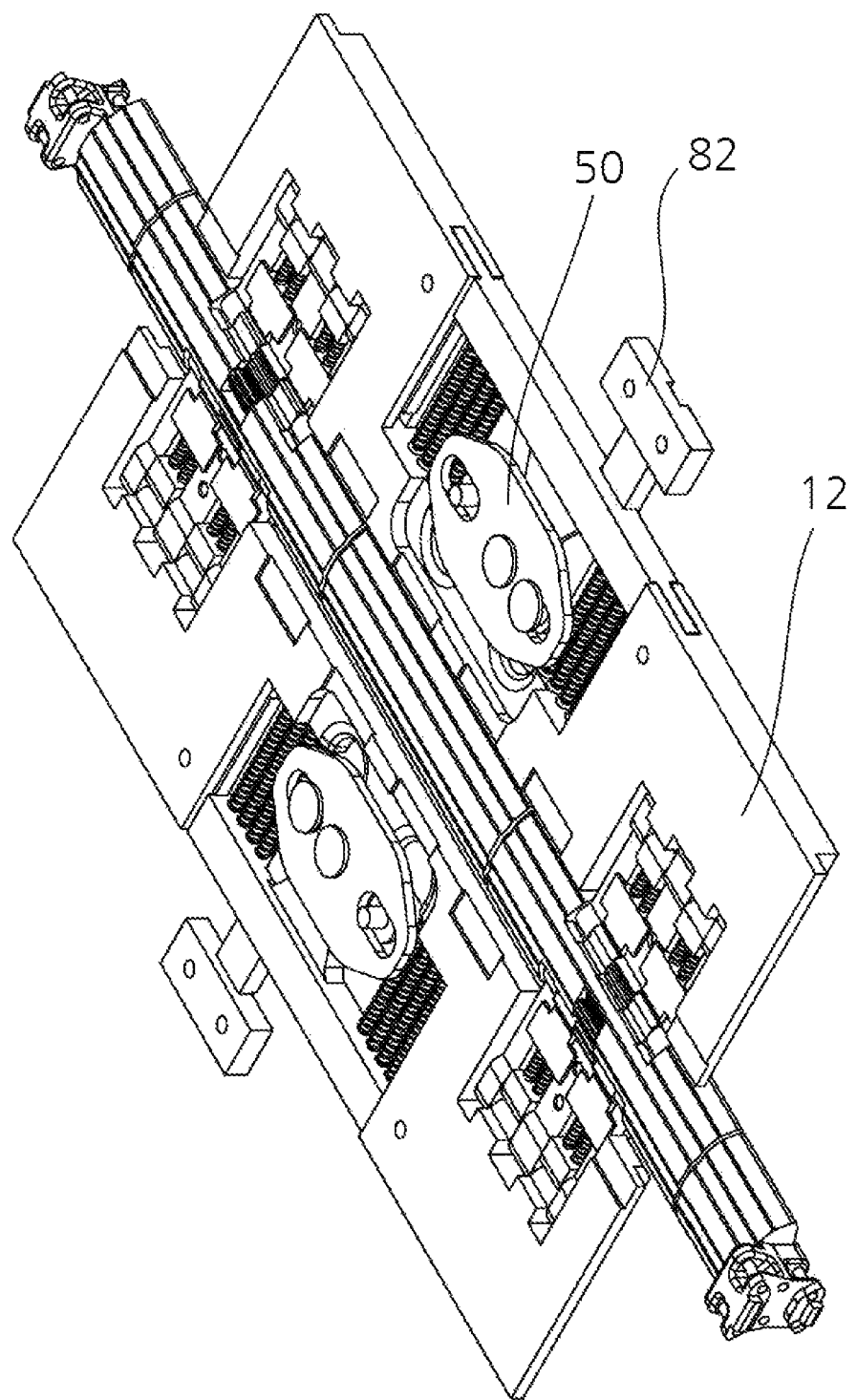

[FIG. 12]
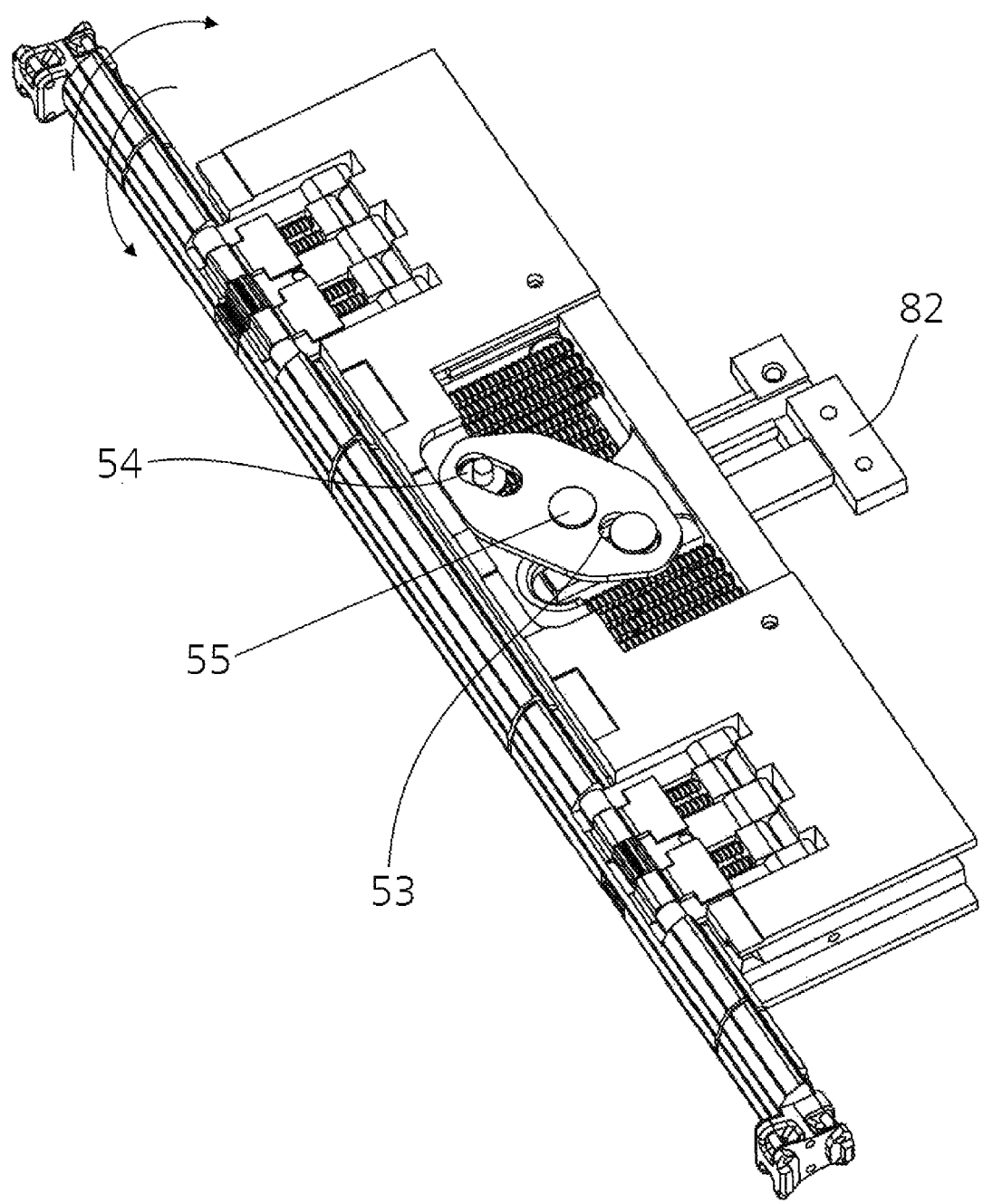

[FIG. 13]
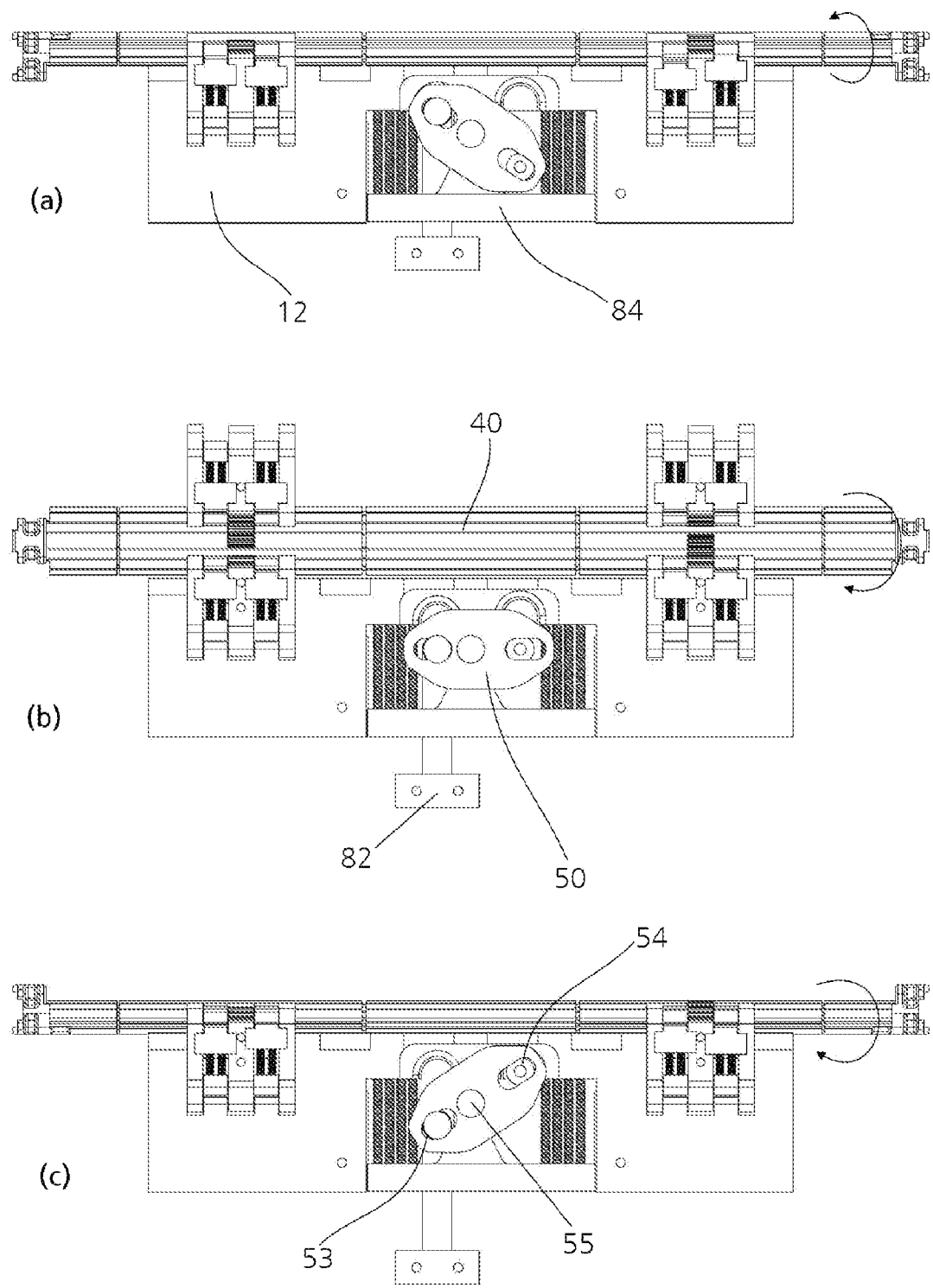

[FIG. 14]
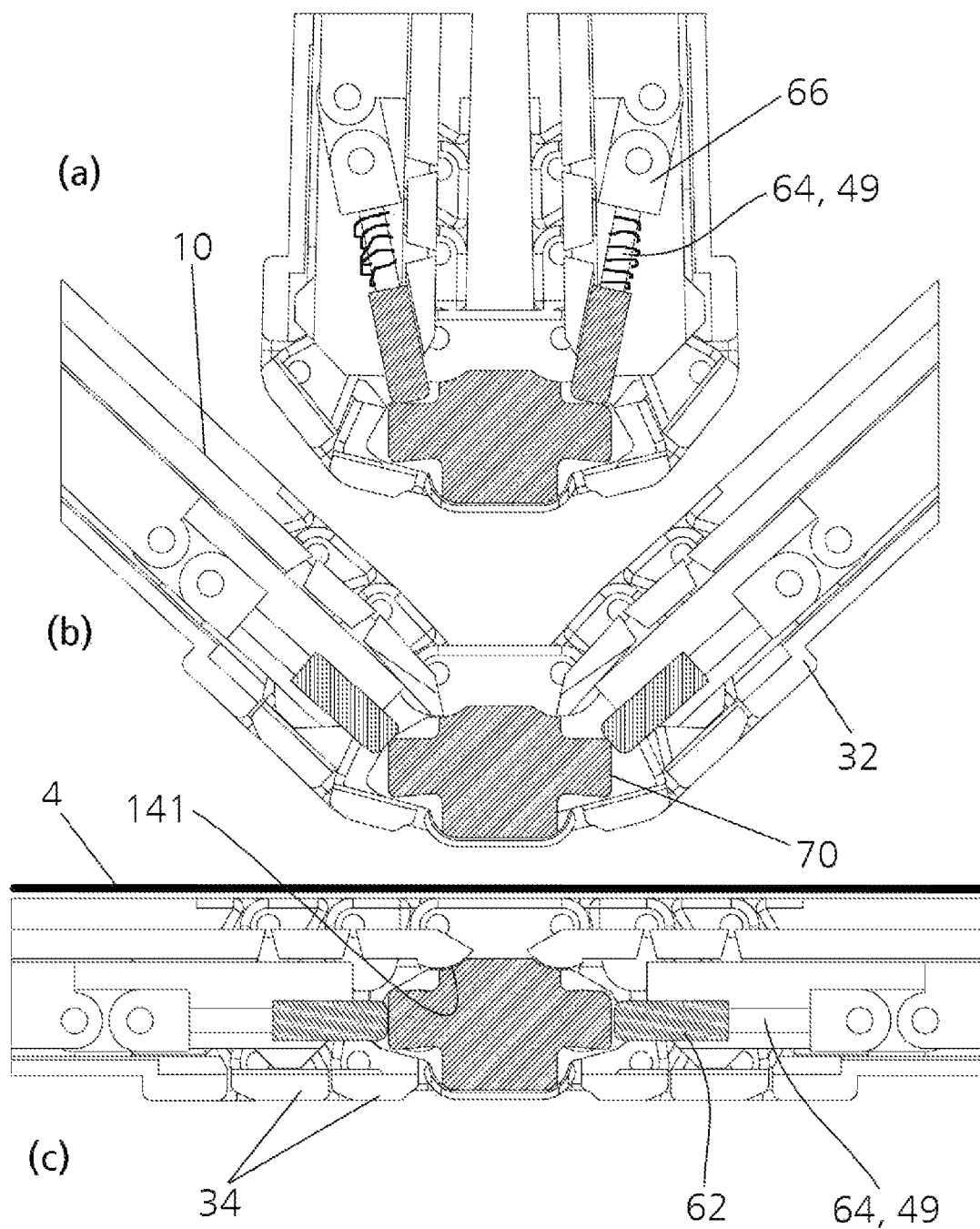

[FIG. 15]
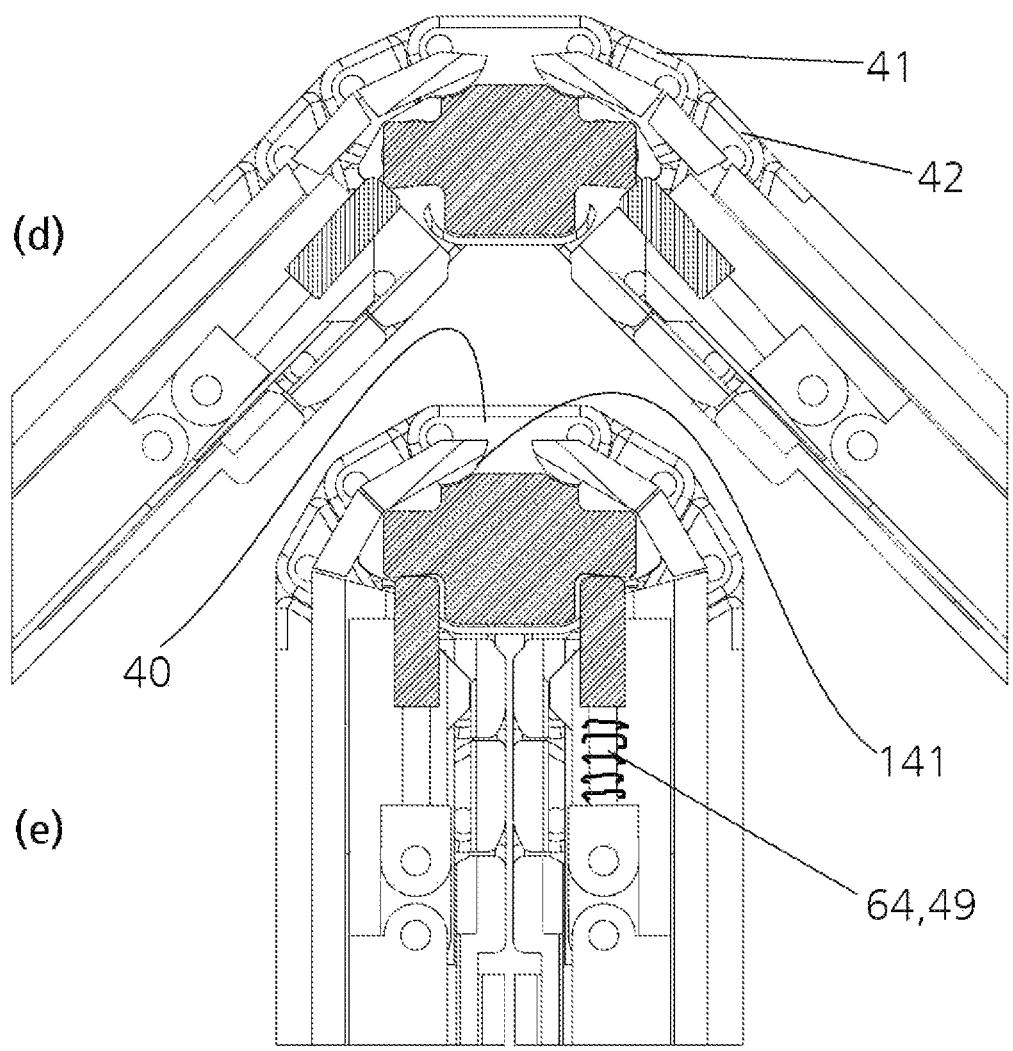

[FIG. 16]
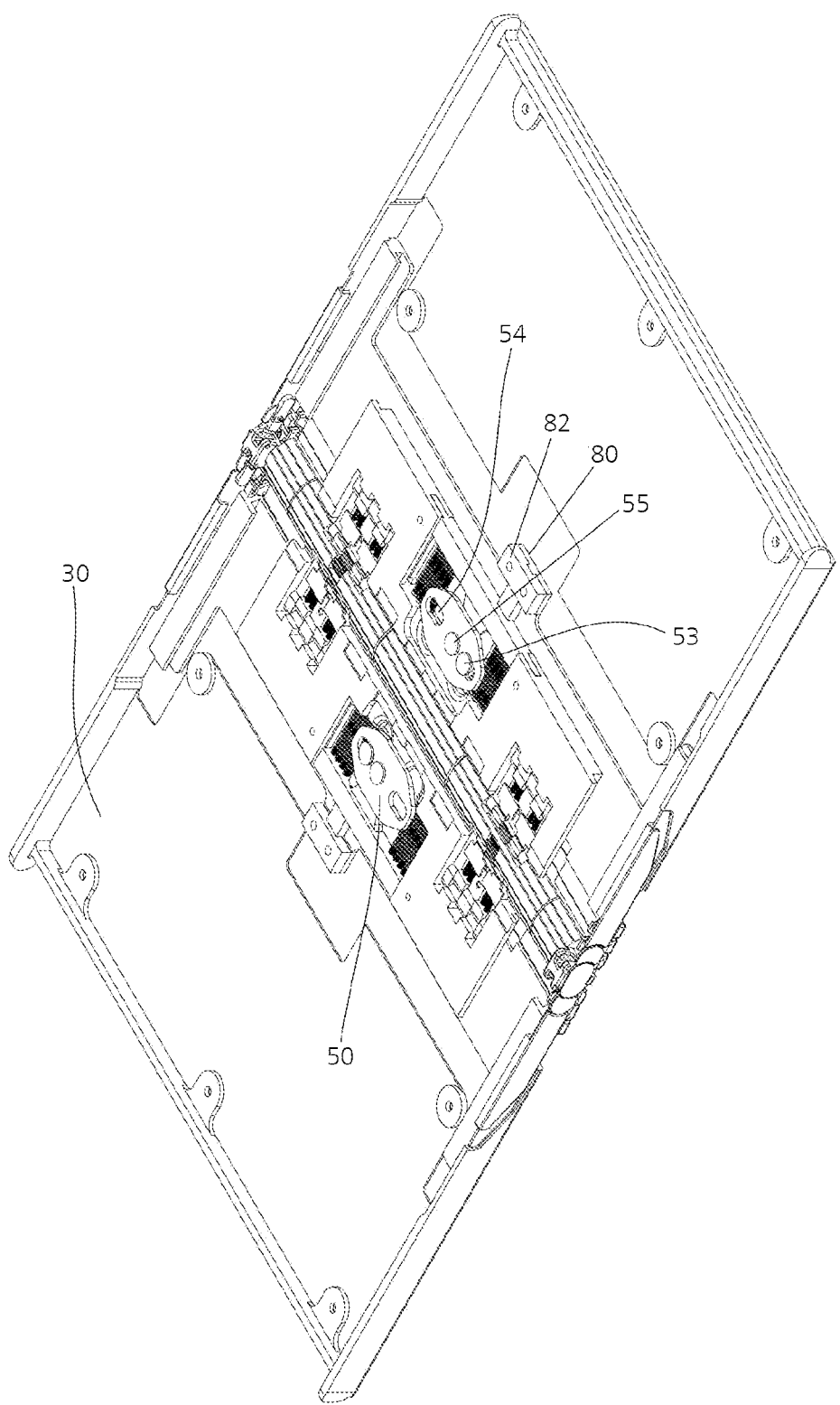

[FIG. 17]
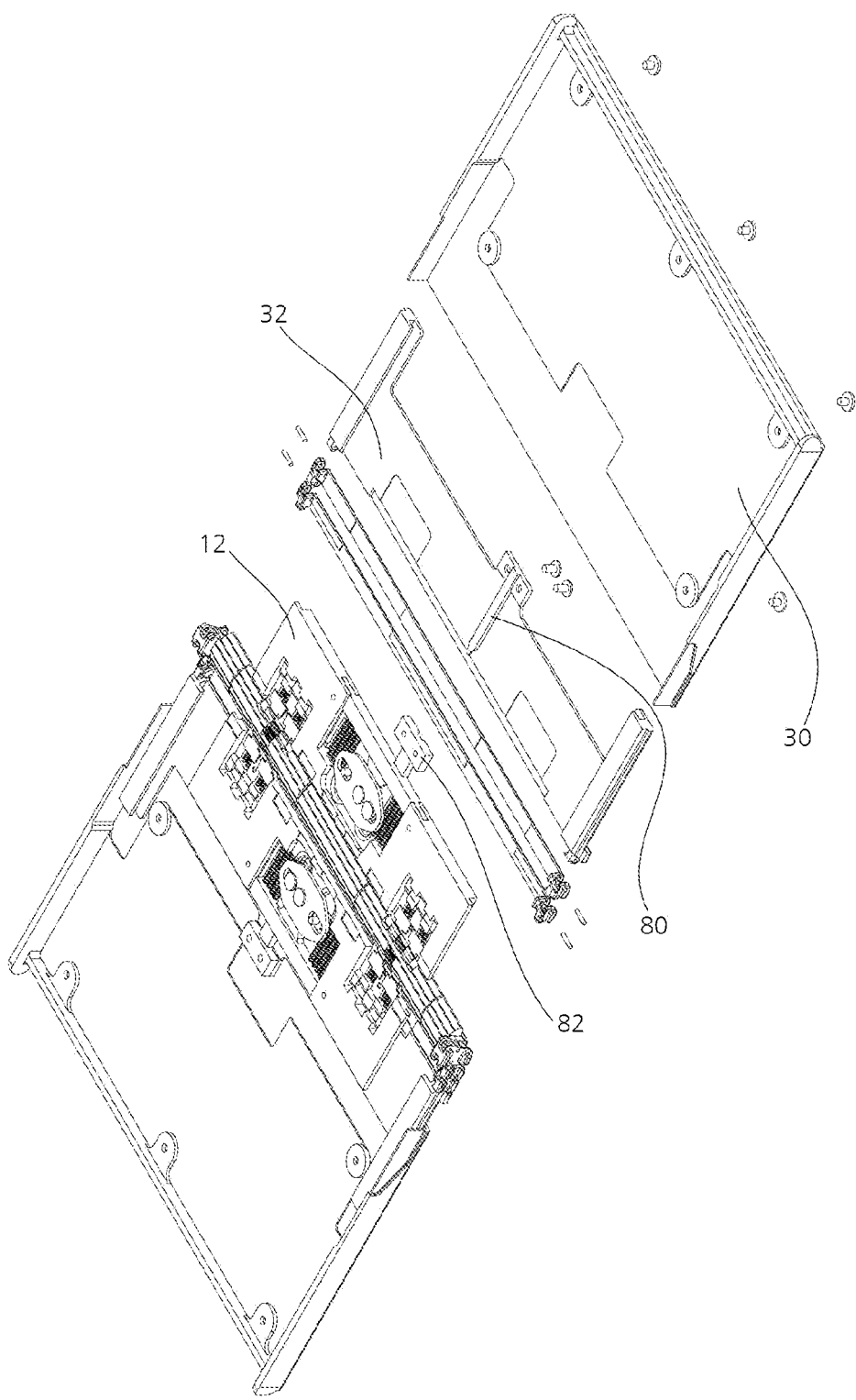

[FIG. 18]
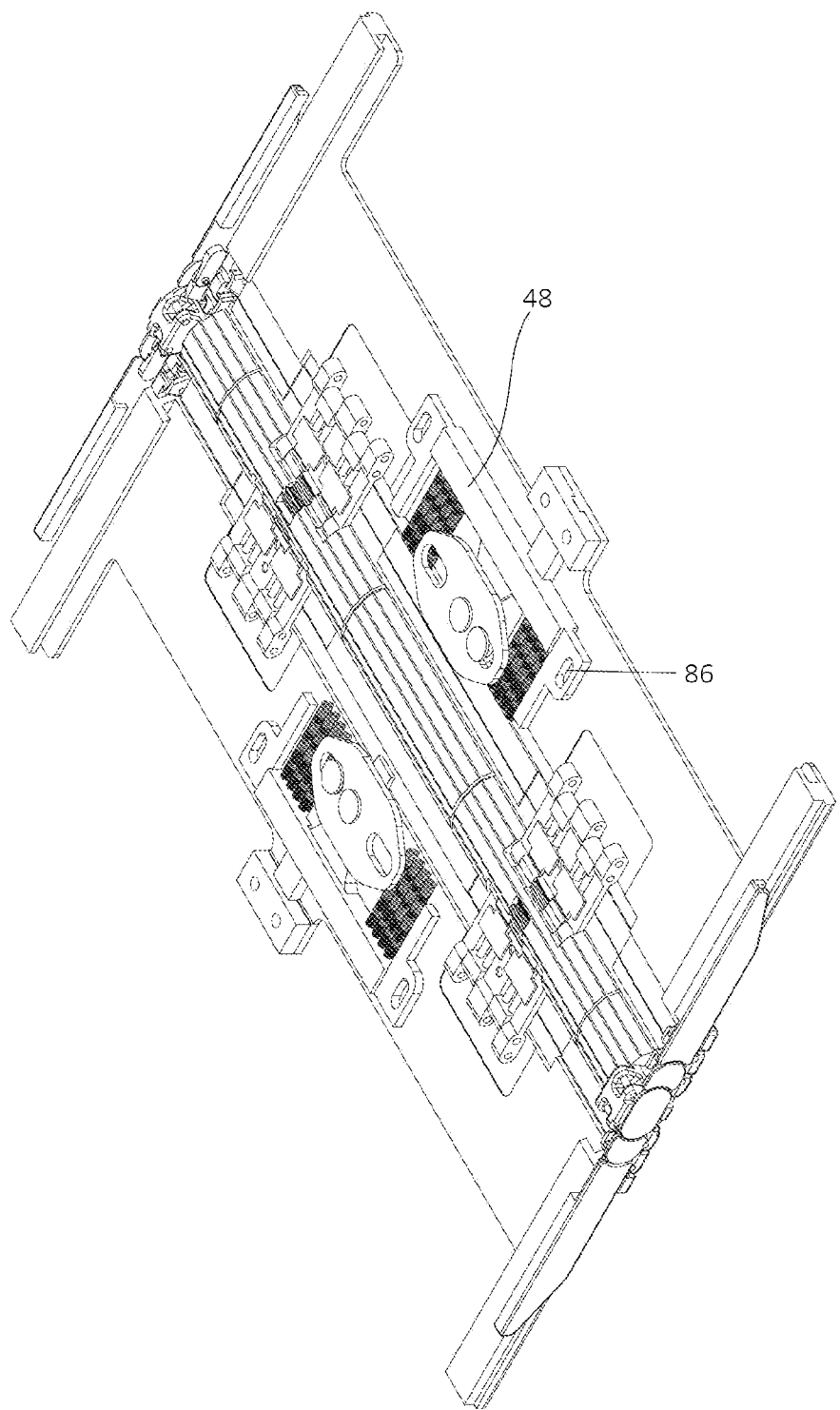

[FIG. 19]
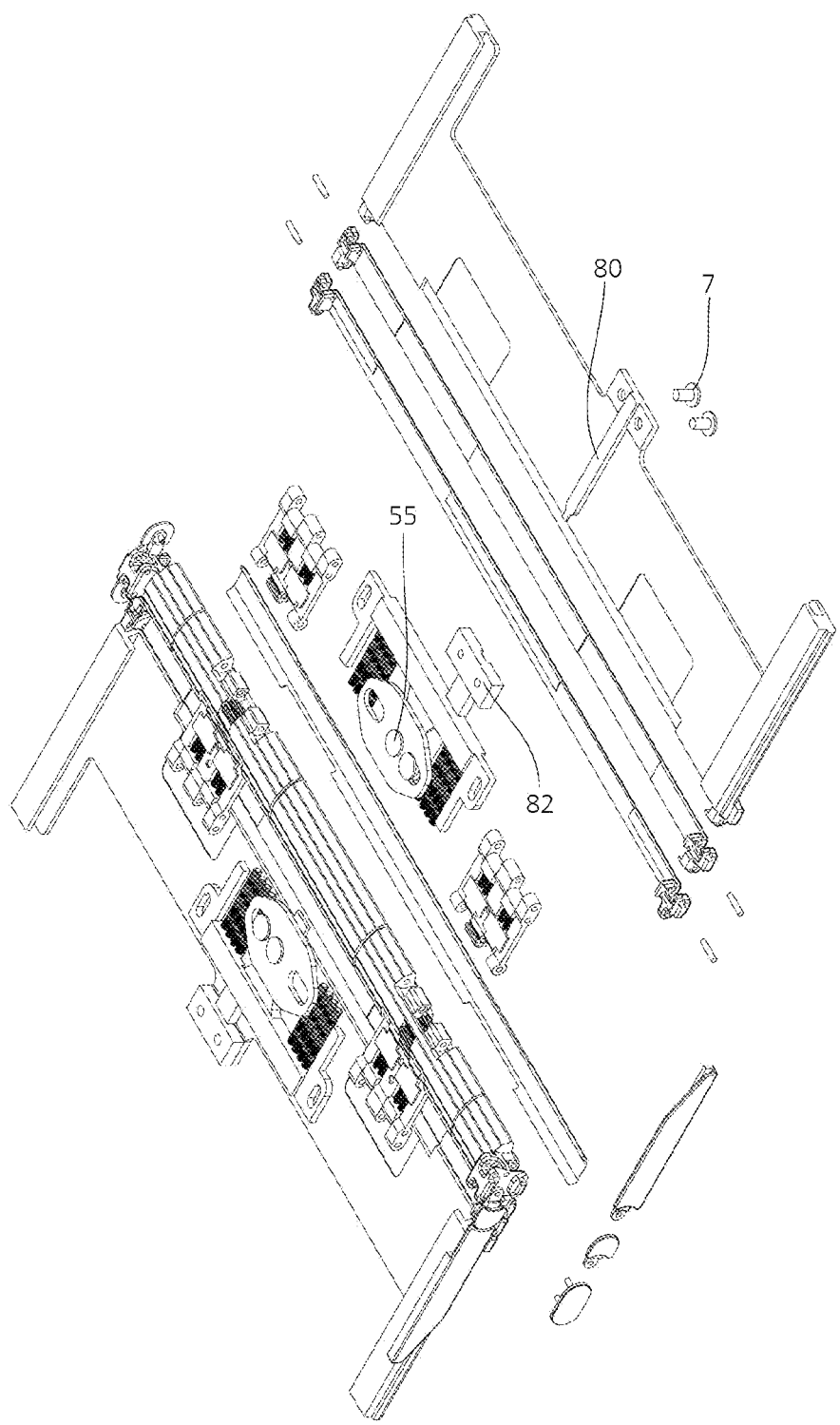

[FIG. 20]
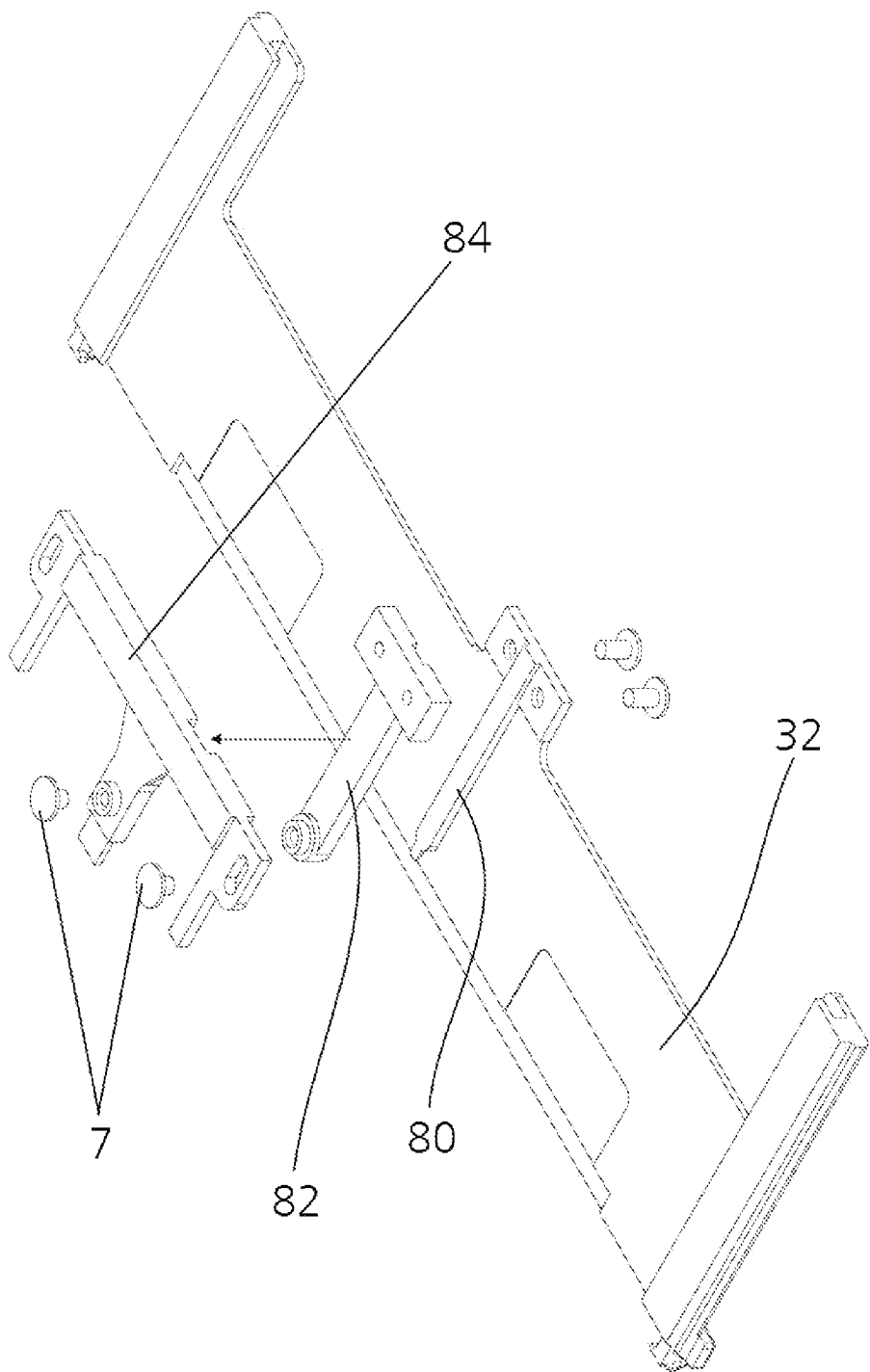

[FIG. 21]
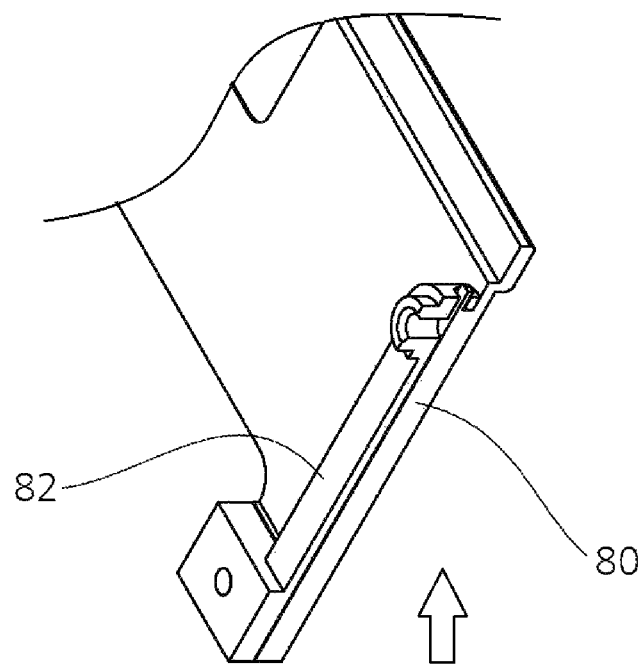
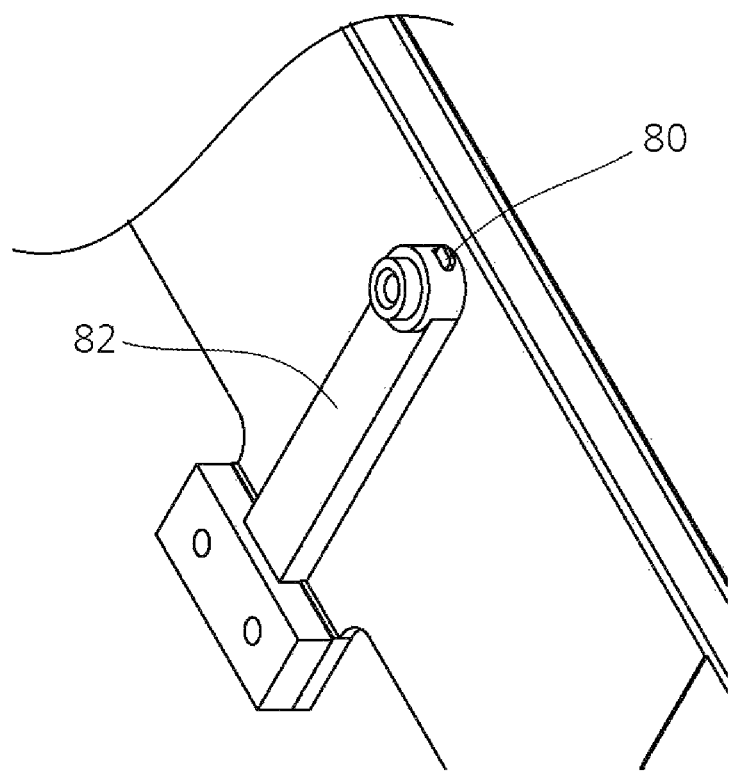

[FIG. 22]
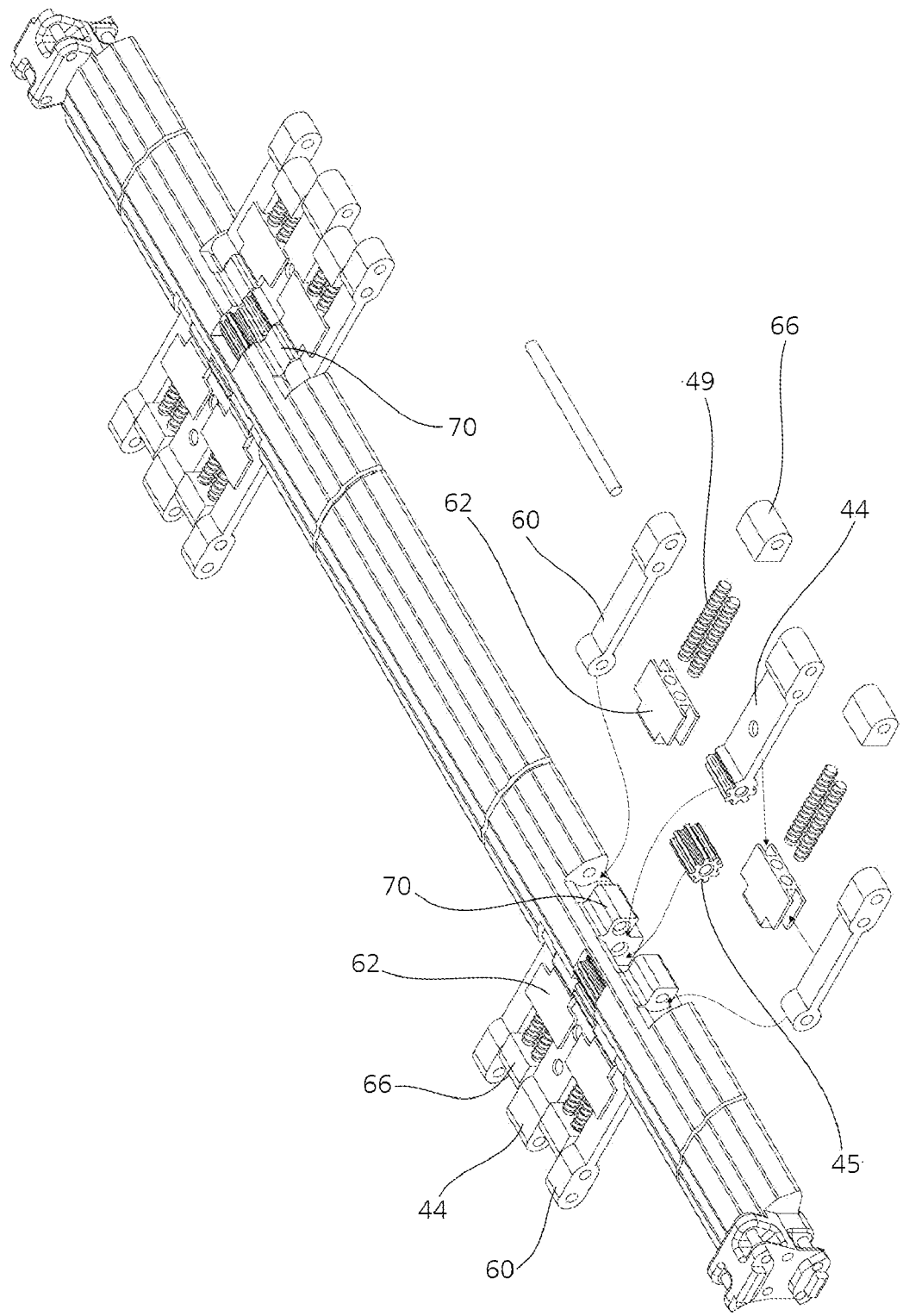

[FIG. 23]
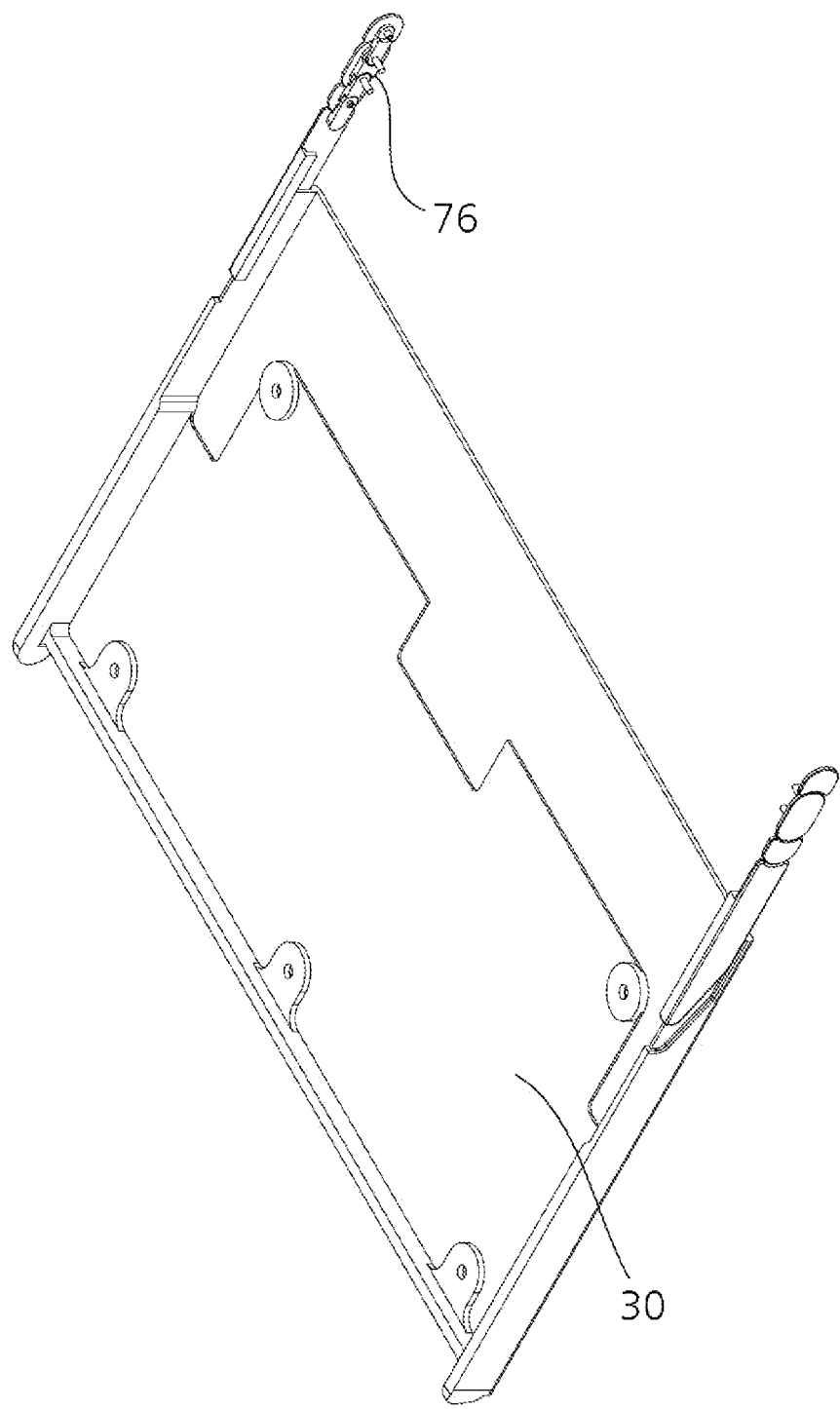

[FIG. 24]
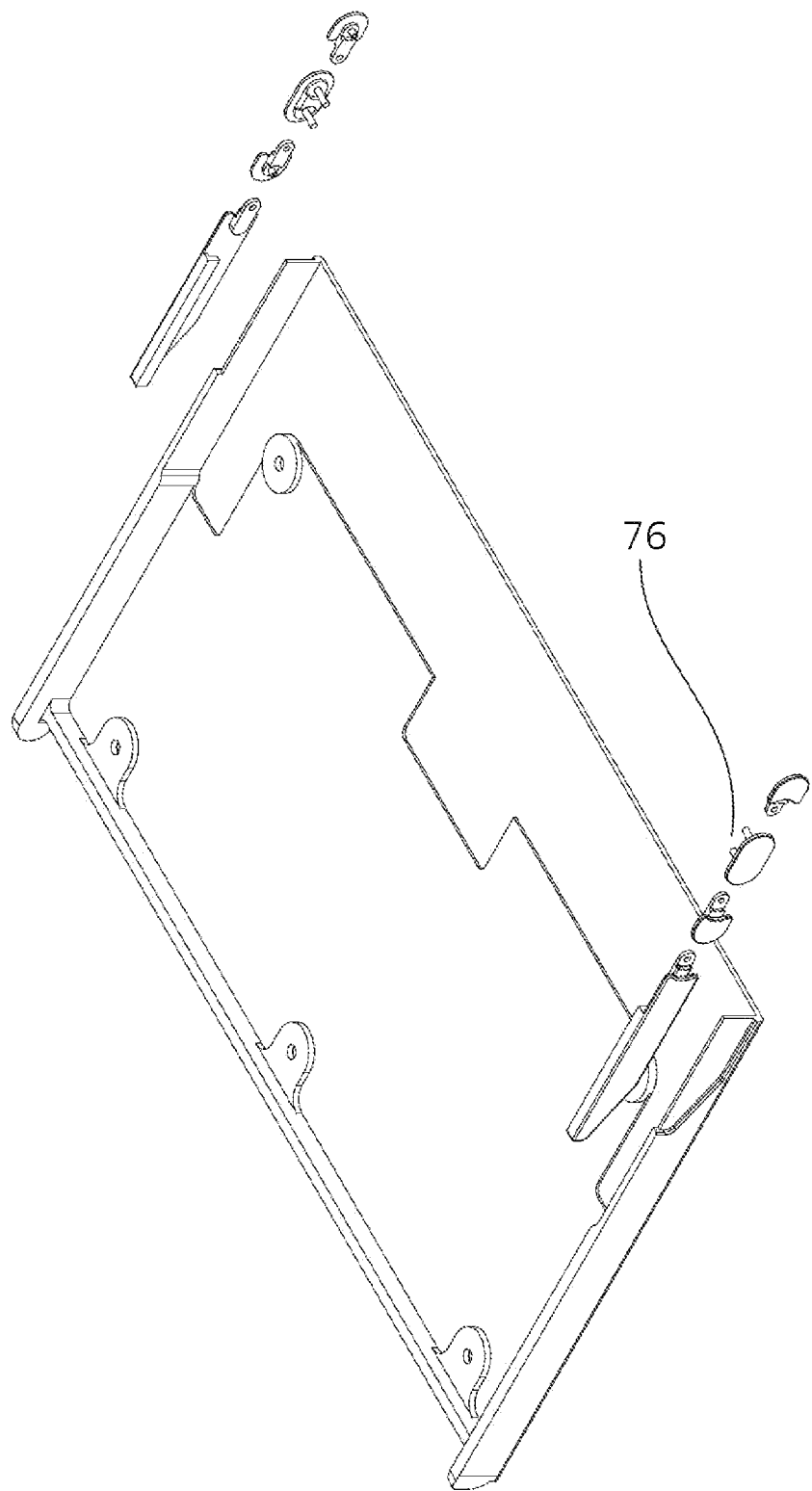

[FIG. 25]
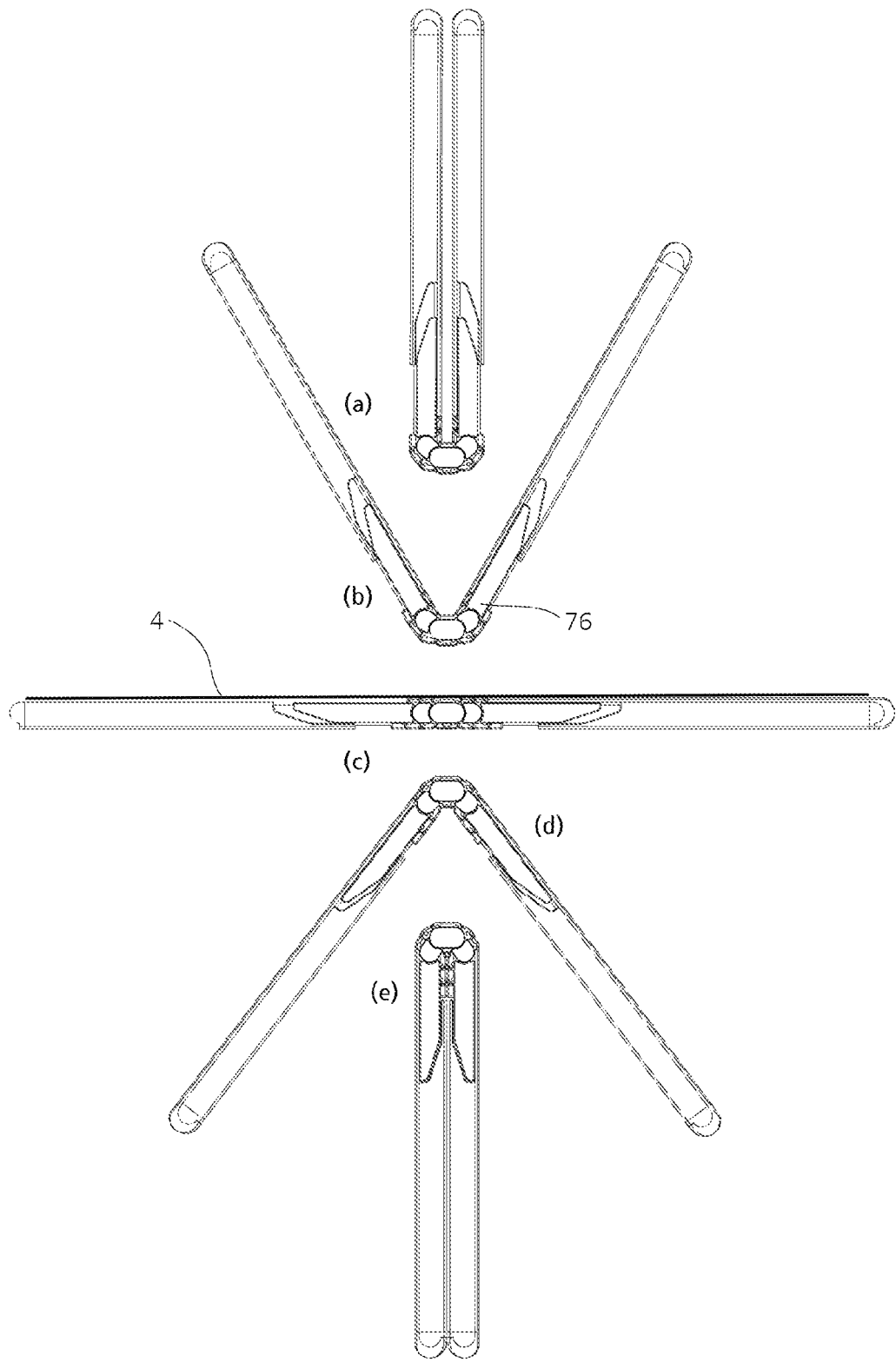

HINGE STRUCTURE FOR TERMINAL FOLDED IN TWO OPPOSING DIRECTIONS

TECHNICAL FIELD

The invention relates to a hinge structure for a mobile communication terminal that is foldable in two opposite directions and, more particularly, to a hinge structure for a mobile communication terminal that is foldable in two opposite directions in which the hinge structure for a mobile communication terminal having a flexible display panel installed therein is foldable inward and outward in a fully unfolded state and a screen on which an image such as a moving image is displayed is invisibly disposed inside or visibly disposed outside in a state in which the mobile communication terminal is folded.

BACKGROUND ART

Mobile communication terminals are configured to perform various functions. Examples of the functions include a data and speech communication function, a function of capturing a still image or a moving image using a camera, a speech storing function, a function of reproducing a music file using a speaker system, and a function of displaying a still image or a moving image (a video).

Some mobile communication terminals have additional functions for playing games, and some mobile communication terminals are embodied as multimedia devices. Recent mobile communication terminals can also receive broadcast or multicast signals and reproduce a video or a television program.

Researches for supporting and improving other functions of mobile communication terminals in addition to the above-mentioned functions have been carried out. These researches include modification and improvement of structural constituents of the mobile communication terminals and addition and improvement of software or hardware.

In general, a display module of a mobile communication terminal displays information which is processed by the mobile communication terminal. For example, when the mobile communication terminal is in a call mode, the display module displays a user interface (UI) or a graphic user interface (GUI) associated with a call.

When the mobile communication terminal is in a video call mode or an image capturing mode, the display module displays a captured or/and received image, a UI, or a GUI. The display module includes a liquid crystal display, a thin-film transistor liquid crystal display, an organic light emitting diode, a flexible display, or a 3D display.

A flexible display (or a flexible LCD) has been regularly researched with its merit of deformability. It takes much time to use a rolled display like a paper roll as shown in science-fiction movie.

Therefore, transitional forms of flexible displays will be many used until the flexible displays are regularly used with sufficient development thereof, and these transitional forms will be similar to current structures of communication terminals. Accordingly, there is necessity for description of usage and protection of flexible displays when such flexible displays are used in mobile communication terminals.

An example of such a hinge structure for a mobile communication terminal having a flexible display panel installed therein is disclosed in Korean Patent Application Laid-open No. 10-2015-0096827 (Title of the Invention: HINGE STRUCTURE AND FOLDABLE DISPLAY DEVICE INCLUDING THE SAME).

SUMMARY OF THE INVENTION

Technical Problem

An objective of the invention is to provide a hinge structure for a mobile communication terminal that is foldable in two opposite directions in which the hinge structure for the mobile communication terminal having a flexible display panel installed therein is foldable inward and outward in a fully unfolded state and a screen on which an image such as a moving image is displayed is invisibly disposed inside or visibly disposed outside in a state in which the mobile communication terminal is folded.

Solution to Problem

In order to achieve the above-mentioned objective, there is provided a hinge structure for a mobile communication terminal that is foldable in two opposite directions, the hinge structure including: upper panels (10) and lower panels (30) that are provided on right and left sides of a central joint (40) and that are foldable inward and outward with respect to the central joint (40); and upper joints (41, 42) that are provided on the right and left sides of a top of the central joint (40) and that are connected to the upper panels (10) and connected to each other.

The hinge structure further includes lower joints (34) that are provided on the right and left sides of a bottom of the central joint (40) and that are connected to lower sliders (32).

The two upper panels (10) may be rotatably connected to the central joint (40),

Two tilting elastic modules may be provided on each of the right and left sides of the central joint (40), and an upper slider (12) may be connected to the two tilting elastic module.

A push member (84) having a rotatable rotational member (50) installed therein may be provided in the push member (84).

The push member (84) may be slidably inserted into a sliding rail of an open groove of the upper slider (12) and an elastic force may be applied thereto in a direction in which the push member is compressed by an elastic member (49).

A range in which the push member (84) is able to move in the sliding rail (31) may be limited depending on a length of a guide groove (86).

The rotational member (50) that is rotatably provided in the push member (84) may be rotatably connected to a connecting portion (9) of bottom surfaces of the upper panels (10) and is rotatably connected to the lower slider (32).

The connecting portion (9) fixed to the bottom surfaces of the upper panels (10) may be connected to the rotational member (50) and an elastic force may be applied to the upper panels (10) in two opposite directions with respect to the central joint (40) when the upper panels (10) are being folded or unfolded.

A cover portion (76) may be provided such that exposed end faces of the central joint (40), the upper joints (41, 42), and the lower joints (34) are covered.

The central joint (40) may include a four-axis gear in which a pair of rotational bars (44) and two gears (45) engaging with the rotational bars (44) are coupled to each other, The pair of rotational bars (44) engaging with each other may be configured to rotate simultaneously in two opposite directions.

An elastic drive member including a front rod (62), a shaft (64) that is inserted into the front rod (62), an elastic member (49) such as a coil spring that is fitted onto the shaft (64), and a rear rod (66) into which the shaft (64) is inserted may be provided on two opposite sides of the rotational bar (44).

Advantageous Effects of the Invention

With the hinge structure for a mobile communication terminal that is foldable in two opposite directions according to the invention, the hinge structure for a mobile communication terminal having a flexible display panel installed therein is configured to be foldable inward and outward in a fully unfolded state and a screen on which an image such as a moving image is displayed is invisibly located inside or visibly located outside in a state in which the mobile communication terminal is folded.

According to the invention, the support portion of the first upper joint is provided to come into contact with the surface of the central joint in a state in which the upper panels and the lower panels coupled to the upper panels are fully unfolded. A part of the flexible display panel attached onto the first upper joint is prevented from being recessed inward when it is pressed by a user. Accordingly, it is possible to prevent the part of the flexible display panel from being damaged.

Since the tilting elastic module is provided in the central joint, a user can stop unfolding of the flexible display panel by adjusting an angle by which the flexible display panel is unfolded, and the flexible display panel can be semi-automatically unfolded when the flexible display panel is unfolded over a predetermined range.

While the upper panels are being unfolded or folded, an elastic force can be normally applied to the upper panels and the lower panels outward from the central joint and the flexible display panel coupled to the upper panels can be normally tightly stretched.

BRIEF DESCRIPTION OF THE DRAWINGS

FIG. 1 is a perspective view of a hinge structure for a mobile communication terminal that is foldable in two opposite directions according to the invention.

FIG. 2 is a perspective view illustrating a bottom of the hinge structure for a mobile communication terminal illustrated in FIG. 1.

FIG. 3 is a perspective view illustrating a state in which an upper hinge portion and a lower hinge portion connected to a central joint are separated from each other in the hinge structure for a mobile communication terminal that is foldable in two opposite directions according to the invention.

FIG. 4 is an enlarged perspective view illustrating a part of joint portions of the lower hinge portion illustrated in FIG. 3.

FIG. 5 is an exploded perspective view illustrating a state in which some constituent parts of the upper hinge portion and the lower hinge portion illustrated in FIG. 3 are separated.

FIG. 6 is an exploded perspective view illustrating a state in which constituent parts of the bottom of the upper hinge portion are separated in the hinge structure for a mobile communication terminal that is foldable in two opposite directions according to the invention.

FIG. 7 is an exploded perspective view illustrating a state in which a right upper panel of the upper hinge portion is separated from the central joint in the hinge structure for a mobile communication terminal that is foldable in two opposite directions according to the invention.

FIG. 8 is a perspective view illustrating the bottom of the upper hinge portion in the hinge structure for a mobile communication terminal that is foldable in two opposite directions according to the invention.

FIG. 9 is an exploded perspective view illustrating a connection structure of upper sliders which are connected to the central joint and slide in the upper panel in the hinge structure for a mobile communication terminal that is foldable in two opposite directions according to the invention.

FIG. 10 is an exploded perspective view illustrating a state in which a semi-automatic drive portion is coupled to the upper slider connected to the central joint in the hinge structure for a mobile communication terminal that is foldable in two opposite directions according to the invention.

FIG. 11 is a perspective view of a drive module that connects a pair of upper panels, semi-automatically drives the upper panels, and applies an elastic force outward from the central joint when the upper panels rotate in the hinge structure for a mobile communication terminal that is foldable in two opposite directions according to the invention.

FIG. 12 is a perspective view of the drive module in a state in which the drive module illustrated in FIG. 11 is folded outward with respect to the central joint.

FIG. 13 is a diagram illustrating movement of a rotational member while a pair of upper sliders connected to the central joint is being folded outward from a state in which the upper sliders are folded inward in the hinge structure for a mobile communication terminal that is foldable in two opposite directions according to the invention.

FIG. 14 is a sectional view illustrating movement of front rods on two sides of the central joint to which an elastic force is applied by a spring when the front rods move along a tilt stopper while the hinge structure for a mobile communication terminal that is foldable in two opposite directions according to the invention is being unfolded from a state in which it is folded in an in-folding manner.

FIG. 15 is a sectional view illustrating movement of the front rods on two sides of the central joint to which an elastic force is applied by a spring when the front rods move along the tilt stopper while the hinge structure for a mobile communication terminal that is foldable in two opposite directions according to the invention is being folded in an out-folding manner in FIG. 14.

FIG. 16 is a sectional view illustrating a state in which the lower sliders and the upper sliders are connected to each other by rotational members in the hinge structure for a mobile communication terminal that is foldable in two opposite directions according to the invention.

FIG. 17 is a perspective view illustrating a state in which one lower slider is separated from the central joint in FIG. 16.

FIG. 18 is a perspective view illustrating a state in which the lower sliders are connected to the central joint by rotational members in the hinge structure for a mobile communication terminal that is foldable in two opposite directions according to the invention.

FIG. 19 is a perspective view illustrating a state in which one lower slider is separated from the central joint in FIG. 18.

FIG. 20 is a perspective view illustrating a configuration in which a lower slider and a rotational member are connected in the hinge structure for a mobile communication terminal that is foldable in two opposite directions according to the invention.

FIG. 21 is a perspective view and a sectional view illustrating a state in which a connecting member is coupled to the lower slider in FIG. 20.

FIG. 22 is a perspective view illustrating a disassembled state and an assembled state of a tilting elastic module which is provided in the central joint in the hinge structure for a mobile communication terminal that is foldable in two opposite directions according to the invention.

FIG. 23 is a perspective view illustrating an assembled state of a cover portion which is provided on a side surface of a connecting part of a pair of lower panels according to the invention.

FIG. 24 is an exploded perspective view illustrating a disassembled state of the cover portion which is provided on a side surface of a connecting part of a pair of lower panels according to the invention in FIG. 23.

FIG. 25 is a sectional view illustrating movement of the hinge structure for a mobile communication terminal that is foldable in two opposite directions according to the invention while the hinge structure is being folded in the out-folding manner from the state in which the hinge structure has been folded in the in-folding manner with a flexible display panel installed on the upper panels.

REFERENCE SIGNS LIST

4: Flexible display panel, 7: Attachment member, 9: Upper panel connecting portion 10: Upper panel, 12: Upper slider, 15: Guide rail 30: Lower panel, 32: Lower slider, 34: Lower joint 36: Guide rail, 40: Central joint, 41: First upper joint 42: Second upper joint, 44: Rotational bar, 49: Elastic drive member 50: Rotational member, 60: Guide bar, 62: Front rod 64: Shaft, 66: Rear rod, 70: Tilt stopper 76: Cover portion, 80: Connecting portion, 82: Connecting member 84: Push member, 86: Guide groove, 141: Support portion

EMBODIMENTS OF THE INVENTION

FIG. 1 is a perspective view of a hinge structure for a mobile communication terminal that is foldable in two opposite directions according to the invention. FIG. 2 is a perspective view of the bottom of the hinge structure for a mobile communication terminal illustrated in FIG. 1.

Referring to FIGS. 1 and 2, a hinge structure for a mobile communication terminal that is foldable in two opposite directions according to the invention has a configuration in which upper panels 10 and lower panels 30 on the right and left sides of a central joint 40 are foldable inward and foldable outward.

Upper joints 41 and 42 connected to the upper panels 10 are connected to the right and left sides of the top of the central joint 40. Lower joints 34 connected to lower sliders 32 are connected to the right and left sides of the bottom of the central joint 40.

FIG. 3 is a perspective view illustrating a state in which an upper hinge portion and a lower hinge portion connected to a central joint are separated from each other in the hinge structure for a mobile communication terminal that is foldable in two opposite directions according to the invention.

FIG. 4 is an exploded perspective view illustrating a part of joint portions of the lower hinge portion illustrated in FIG. 3.

Referring to FIGS. 3 and 4, a cover portion 76 is configured such that exposed end faces of a central joint 40, upper joints 41 and 42, and a lower joint 34 are covered to make side surfaces of the central joint 40, the upper joints 41 and 42, and the lower joint 34 invisible from the outside.

FIG. 5 is an exploded perspective view illustrating a state in which some constituent parts of the upper hinge portion and the lower hinge portion illustrated in FIG. 3 are separated.

Referring to FIG. 5, first upper joints 41 and second upper joints 42 which are connected to upper panels 10 are coupled to right and left sides of the top of the central joint 40, and lower joints 34 which are connected to a lower panel 30 are coupled to right and left sides of the bottom of the central joint 40.

Each lower joint 34 is connected to a corresponding lower slider 32, and the lower slider 32 is disposed inside the side surface of the corresponding lower panel 30.

FIG. 6 is an exploded perspective view illustrating a bottom view in which constituent parts of the upper hinge portion are separated in the hinge structure for a mobile communication terminal that is foldable in two opposite directions according to the invention.

Referring to FIG. 6, a pair of upper panels 10 on the right and left sides is connected to the central joint 40 such that they can rotate. Two tilting elastic modules (see FIG. 22) are provided on the right and left sides of the central joint 40, and upper sliders 12 are connected to the tilting elastic modules.

A push member 84 in which a rotatable rotational member 50 is provided is installed in each upper slider 12.

The push member 84 is inserted into a sliding rail of an open groove of the upper slider 12 to slide therein, and an elastic force is applied to the push member 84 in a direction opposite to a compression direction of a plurality of elastic members 49 such as compression coil springs.

A range in which the push member 84 can move in the sliding rail 31 is limited by a length of a guide groove 86.

The rotational member 50 which is provided to be rotatable in the push member 84 is rotatably connected to a connecting portion 9 of the bottom surface of the upper panel 10 and is rotatably connected to the lower slider 32.

Accordingly, when the upper panels 10 are being folded or unfolded, an elastic force is applied to a pair of upper panels 10 in tow opposite directions which are perpendicular to the length direction of the central joint 40 with respect to the central joint 40 because the connecting portions 9 fixed to the bottoms surface of the upper panels 10 are connected to the rotational member 50.

FIG. 7 is an exploded perspective view illustrating a state in which the right upper panel of the upper hinge portion is separated from the central joint in the hinge structure for a mobile communication terminal that is foldable in two opposite directions according to the invention.

Referring to FIG. 7, the upper slider 12 that slides on the bottom surface of the right upper panel 10 out of the upper sliders 12 is separated from the bottom surface of the upper panel 10.

FIG. 8 is a perspective view illustrating the bottom of the upper hinge portion in the hinge structure for a mobile communication terminal that is foldable in two opposite directions according to the invention.

Referring to FIG. 8, on the rear surfaces of the upper panels 10 according to the invention, the upper sliders 12 on the right and left sides of the central joint 40 are slidably inserted into the guide rails 15 formed in the upper panels 10, and the push member 84 that slides along the sliding rail 31 with an elastic force applied by an elastic member 49 such as a compression coil spring is provided in each upper slider 12.

The connecting portion 9 fixed to the rear surface of each upper panel 10 is connected to one guide groove 54 of the rotational member 50 by an attachment member 7 such as a rivet or a screw.

FIG. 9 is an exploded perspective view illustrating a connection structure of upper sliders which are connected to the central joint and slide in the upper panel in the hinge structure for a mobile communication terminal that is foldable in two opposite directions according to the invention. FIG. 10 is an exploded perspective view illustrating a state in which a semi-automatic drive portion is coupled to the upper slider connected to the central joint in the hinge structure for a mobile communication terminal that is foldable in two opposite directions according to the invention.

Referring to FIGS. 9 and 10, two tilting elastic modules are provided on each side of the central joint 40, and the upper slider 12 is rotatably connected to ends of a guide bar 60 and a rotational bar 44 of the tilting elastic module.

A center hole 55 of the rotational member 50 is rotatably connected to the push member 84 by the attachment member 7 such as a screw or a rivet, and the connecting portion 9 provided on the bottom surface of each upper panel 10 and a connecting member 82 fixed to the corresponding lower slider 32 are rotatably connected to guide grooves 53 and 54 on two opposite sides of the center hole.

FIG. 11 is a perspective view of a drive module that connects a pair of upper panels, semi-automatically drives the upper panels, and applies an elastic force outward from the central joint when the upper panels rotate in the hinge structure for a mobile communication terminal that is foldable in two opposite directions according to the invention.

Referring to FIG. 11, when the upper sliders 12 are straightly stretched with respect to the central joint 40, the rotational member 50 is configured to rotate in a direction parallel to the length direction of the central joint 40.

FIG. 12 is a perspective view of the drive module in a state in which the drive module illustrated in FIG. 11 is folded outward with respect to the central joint.

Referring to FIG. 12, when the upper sliders 12 are folded in the arrow direction, the guide groove 53 of the rotational member 50 connected to the connecting member 82 fixed to the corresponding lower slider 32 rotates downward.

FIG. 13 is a diagram illustrating movement of the rotational member while a pair of upper sliders connected to the central joint is being folded outward from a state in which the upper sliders are folded inward in the hinge structure for a mobile communication terminal that is foldable in two opposite directions according to the invention.

Referring to FIG. 13, FIG. 13(*a*) illustrates a state in which the upper sliders 12 are folded in an in-folding direction (the arrow direction). The guide groove 53 of the rotational member 50 connected to the connecting member 82 fixed to the corresponding lower slider 32 rotates toward the central joint 40 about a rotation axis.

FIG. 13(*b*) illustrates the upper slider 12 and the central joint 40 in a state in which a pair of upper panels 10 is fully unfolded, and FIG. 13(*c*) illustrates the position of the rotational member 50 in a state in which the pair of upper panels 10 are folded in an out-folding direction (the arrow direction) which is opposite to that in FIG. 13(*a*).

Each upper panel 10 is connected to the guide groove 54 and is supplied with an elastic force from the elastic members 49. Each lower panel 30 is connected to the guide groove 53 and is supplied with an elastic force from the elastic members 49.

The elastic members 49 apply an elastic force to the push member 84. The same elastic force from the elastic members is applied to the rotational member 50 provided in the push member 84 such that the rotation axis 55 can rotate. The same elastic force from the elastic members 49 is applied to the push member 84 and the upper panel 10 and the lower slider 32 connected to the guide grooves 53 and 54. Accordingly, the pair of upper panels 10 and the pair of lower sliders 32 are normally supplied with an elastic force such that they are pressed in the opposite directions perpendicular to the length direction of the central joint 40.

FIG. 14 is a sectional view illustrating movement of front rods on two sides of the central joint to which an elastic force is applied by a spring when the front rods move along a tilt stopper while the hinge structure for a mobile communication terminal that is foldable in two opposite directions according to the invention is being unfolded from a state in which it is folded in an in-folding manner. FIG. 15 is a sectional view illustrating movement of the front rods on two sides of the central joint to which an elastic force is applied by a spring when the front rods move along the tilt stopper while the hinge structure for a mobile communication terminal that is foldable in two opposite directions according to the invention is being folded in an out-folding manner in FIG. 14.

FIGS. 14 and 15 illustrate movement of the tilting elastic module (see FIG. 22) while the upper panels 10 and the lower panels 30 coupled to the upper panels 10 are simultaneously unfolded to a fully unfolded state from a state in which the flexible display panel is disposed inside with a pair of upper panels 10 folded (an in-folded state illustrated in FIG. 14(*a*)).

Referring to FIG. 14(*c*), support portions 141 of the first upper joints 41 are configured to come into contact with the surface of the central joint 40 in a state (a state illustrated FIG. 14(*c*)) in which the upper panels 10 and the lower panels 30 coupled to the upper panels 10 are fully unfolded.

Parts of the flexible display panel attached onto the first upper joints 41 are prevented from being recessed inward when the parts are pressed by a user. Accordingly, it is possible to prevent the parts of the flexible display panel from being damaged.

When the pair of upper panels 10 is unfolded from the in-folded state (see FIG. 14(*a*)), an elastic force is applied to the front rods 62 from the elastic members 49 such as springs fitted onto the shafts 64, and the front rods 62 with the elastic force applied thereto are hooked to the tilt stopper 70 formed on a part of the central joint 40 and semi-automatically press the upper panels 10 and the lower panels 30 coupled to the upper panels 10 such that they are fully unfolded or movement of the upper panels 10 and the lower panels 30 coupled to the upper panels 10 stops at a specific position.

FIG. 16 is a sectional view illustrating a state in which the lower sliders and the upper sliders are connected to each other by rotational members in the hinge structure for a mobile communication terminal that is foldable in two opposite directions according to the invention. FIG. 17 is a perspective view illustrating a state in which one lower slider is separated from the central joint in FIG. 16.

Referring to FIGS. 16 and 17, a connecting portion 80 of each lower slider is provided in the hinge structure for a mobile communication terminal that is foldable in two opposite directions according to the invention. A front part of the connecting member 82 fixed to the connecting portion 80 is coupled to the guide groove 53 of the rotational member 50 by an attachment member 7 such as a screw or a rivet, and the rotation axis 55 of the rotational member 50 is rotatably connected to the push member 84 provided in the corresponding upper slider 12.

The connecting portion 9 formed on the bottom surface of the upper panel 10 is coupled to the other guide groove 54. The lower panels 30 are placed on the bottom surfaces of the lower sliders 32. The lower panels 30 are coupled to the corresponding upper panels 10 by the attachment member 7 such as a screw or a rivet.

Each lower slider 32 is inserted into a guide rail 36 formed on the inner side surface of the corresponding upper panel 10 in a state in which the lower slider is coupled to the upper panel 10, and slides along the guide rail 36.

FIG. 18 is a perspective view illustrating a state in which the lower sliders are connected to the central joint by rotational members in the hinge structure for a mobile communication terminal that is foldable in two opposite directions according to the invention. FIG. 19 is a perspective view illustrating a state in which one lower slider is separated from the central joint in FIG. 18.

FIGS. 18 and 19 illustrate a state in which the lower panel 30 and the upper slider 12 are removed in the configuration illustrated in FIGS. 16 and 17.

FIG. 20 is a perspective view illustrating a configuration in which a lower slider and a rotational member are connected in the hinge structure for a mobile communication terminal that is foldable in two opposite directions according to the invention. FIG. 21 is a perspective view and a sectional view illustrating a state in which a connecting member is coupled to the lower slider in FIG. 20.

Referring to FIGS. 20 and 21, the front part of the connecting portion 80 of the lower slider 32 is inserted into a front hole of the connecting member 82 and a rear part thereof is coupled to the rear part of the connecting member 82 by the attachment member 7 such as a rivet or a screw.

FIG. 22 is a perspective view illustrating a disassembled state and an assembled state of a tilting elastic module which is provided in the central joint in the hinge structure for a mobile communication terminal that is foldable in two opposite directions according to the invention.

The tilting elastic module which is provided in the central joint 40 will be described below with reference to FIG. 22. The central joint 40 includes a four-axis gear in which a pair of rotational bars 44 and two gears 45 engaging with the rotational bars 44 are coupled to each other.

The pair of rotational bars 44 engaging with each other is configured to rotate simultaneously in the two opposite directions.

An elastic drive member including a front rod 62, shafts 64 that are inserted into the front rod 62, elastic members 49 such as coil springs that are fitted onto the shafts 64, and a rear rod 66 into which the shafts 64 are inserted is provided on two opposite sides of each rotational bar 44.

The front rod 62 of the elastic drive member is configured to slide along the shafts 64 onto which the elastic members 49 such as coil springs are fitted. The front rod 62 is interposed between the guide bar 60 and the rotational bar 44 and slides to move forward and rearward.

A tilt stopper 70 is formed at a position at which the front rod 62 is provided in the central joint 40. A semi-automatic drive member that automatically moves the tilting elastic module including the rotational bar 44, the guide bars 60, and the front rode 62 with an elastic force when the elastic drive member reaches a threshold point at the time of rotation about the central joint 40.

The shape of the tilt stopper 70 can be freely deformed to adjust an angle by which the front rod 62 is tilted.

FIG. 23 is a perspective view illustrating an assembled state of a cover portion which is provided on a side surface of a connecting part of a pair of lower panels according to the invention. FIG. 25 is a sectional view illustrating movement of the hinge structure for a mobile communication terminal that is foldable in two opposite directions according to the invention while the hinge structure is being folded in the out-folding manner from the state in which the hinge structure has been folded in the in-folding manner with a flexible display panel installed on the upper panels.

Referring to FIGS. 23 and 24, a cover portion 76 is provided at a position at which a pair of lower panels 30 is connected to each other such that the central joint 40 and the upper and lower joints are invisible from the outside.

FIG. 25 is a sectional view illustrating movement of the hinge structure for a mobile communication terminal that is foldable in two opposite directions according to the invention while the hinge structure is being folded in the out-folding manner from the state in which the hinge structure has been folded in the in-folding manner with a flexible display panel installed on the upper panels.

Referring to FIG. 25, a flexible display panel 4 is provided on the upper panels 10 in the hinge structure for a mobile communication terminal that is foldable in two opposite directions according to the invention.

Movement of the hinge structure according to the invention while the hinge structure is gradually being unfolded (states illustrated in FIGS. 25(*b*) and 25(*c*)) from a state (a state illustrated in FIG. 25(*a*)) in which the hinge structure has been folded in an in-folding manner in which the flexible display panel 4 is disposed inside and then is being folded in an out-folding manner in which the flexible display panel 4 is disposed outside is illustrated in FIG. 25 along with movement of the cover portion 76.

INDUSTRIAL APPLICABILITY

While an exemplary embodiment of the invention has been described above using specific terms, such description is only for explanation and it is obvious that the embodiment can be modified in various forms without departing from the technical spirit and scope of the appended claims. Such modified embodiments should not be understood separately from the spirit and scope of the invention and should belong to the appended claims.

The invention claimed is:

1. A hinge structure for a mobile communication terminal that is foldable in two opposite directions, the hinge structure comprising:
  upper panels (10) and lower panels (30) that are provided on right and left sides of a central joint (40) and that are foldable inward and outward with respect to the central joint (40);
  upper joints (41, 42) that are provided on the right and left sides of a top of the central joint (40) and that are connected to the upper panels (10) and connected to each other; and
  lower joints (34) that are provided on the right and left sides of a bottom of the central joint (40) and that are connected to lower sliders (32),
  wherein the two upper panels (10) are rotatably connected to the central joint (40), wherein two tilting elastic modules are provided on each of the right and left sides of the central joint (40), wherein an upper slider (12) is connected to the two tilting elastic module, wherein a push member (84) having a rotatable rotational member (50) installed therein is provided in the push member (84), wherein the push member (84) is slidably inserted into a sliding rail of an open groove of the upper slider (12) and an elastic force is applied thereto in a direction in which the push member is compressed by an elastic member (49), and wherein a range in which the push member (84) is able to move in the sliding rail (31) is limited depending on a length of a guide groove (86).

2. The hinge structure for the mobile communication terminal that is foldable in two opposite directions according to claim 1, wherein the rotational member (50) that is rotatably provided in the push member (84) is rotatably connected to a connecting portion (9) of bottom surfaces of the upper panels (10) and is rotatably connected to the lower slider (32), and wherein the connecting portion (9) fixed to the bottom surfaces of the upper panels (10) is connected to the rotational member (50) and an elastic force is applied to the upper panels (10) in two opposite directions with respect to the central joint (40) when the upper panels (10) are being folded or unfolded.

3. A hinge structure for a mobile communication terminal that is foldable in two opposite directions, the hinge structure comprising:

upper panels (10) and lower panels (30) that are provided on right and left sides of a central joint (40) and that are foldable inward and outward with respect to the central joint (40);

upper joints (41, 42) that are provided on the right and left sides of a top of the central joint (40) and that are connected to the upper panels (10) and connected to each other; and lower joints (34) that are provided on the right and left sides of a bottom of the central joint (40) and that are connected to lower sliders (32), wherein the central joint (40) includes a four-axis gear in which a pair of rotational bars (44) and two gears (45) engaging with the rotational bars (44) are coupled to each other, wherein the pair of rotational bars (44) engaging with each other is configured to rotate simultaneously in two opposite directions, and wherein an elastic drive member including a front rod (62), a shaft (64) that is inserted into the front rod (62), an elastic member (49) such as a coil spring that is fitted onto the shaft (64), and a rear rod (66) into which the shaft (64) is inserted is provided on two opposite sides of the rotational bar (44).

\* \* \* \* \*